(12) United States Patent
Hatakeyama

(10) Patent No.: US 7,388,687 B2
(45) Date of Patent: Jun. 17, 2008

(54) METHOD OF EVALUATING IMAGE PATTERN OUTPUT ACCURACY

(75) Inventor: Mamoru Hatakeyama, Sakota (JP)

(73) Assignee: Seiko Epson Corporation, Tokyo (JP)

( * ) Notice: Subject to any disclaimer, the term of this patent is extended or adjusted under 35 U.S.C. 154(b) by 1052 days.

(21) Appl. No.: 10/452,120

(22) Filed: Jun. 3, 2003

(65) Prior Publication Data

US 2004/0213435 A1 Oct. 28, 2004

(30) Foreign Application Priority Data

Jun. 12, 2002 (JP) .............................. 2002-171781

(51) Int. Cl.
*G06F 15/00* (2006.01)
*G06K 9/36* (2006.01)

(52) U.S. Cl. ...................... 358/1.9; 358/1.14; 382/286

(58) Field of Classification Search ................ 358/504, 358/1.9, 406, 1.1, 1.15, 1.4, 3.2, 3.31, 1.16, 358/1.18; 382/112, 165, 167, 286, 162
See application file for complete search history.

(56) References Cited

U.S. PATENT DOCUMENTS

| | | | | |
|---|---|---|---|---|
| 5,941,649 A | * | 8/1999 | Hansel et al. ................ | 400/703 |
| 6,275,600 B1 | * | 8/2001 | Banker et al. ................ | 382/112 |
| 6,333,997 B1 | * | 12/2001 | Hashiya et al. .............. | 382/201 |
| 6,606,395 B1 | * | 8/2003 | Rasmussen et al. ......... | 382/112 |
| 6,623,096 B1 | * | 9/2003 | Castano et al. ............... | 347/19 |
| 6,665,424 B1 | * | 12/2003 | Stringa ........................ | 382/112 |
| 6,665,425 B1 | * | 12/2003 | Sampath et al. ............. | 382/112 |
| 6,862,414 B2 | * | 3/2005 | Sampath et al. ............. | 399/15 |
| 7,260,244 B2 | * | 8/2007 | Shikami et al. ............. | 382/112 |
| 2003/0184776 A1 | * | 10/2003 | Ishizuka ...................... | 358/1.9 |
| 2003/0193684 A1 | * | 10/2003 | Kendall et al. ............. | 358/1.14 |
| 2005/0179710 A1 | * | 8/2005 | Tatsuta et al. ................ | 347/5 |
| 2006/0139705 A1 | * | 6/2006 | Piatt et al. ................... | 358/504 |

FOREIGN PATENT DOCUMENTS

JP A 5-20437 1/1993

OTHER PUBLICATIONS

M. Hatakeyama et al., "Consideration of Method of Evaluating Ink Exhalation Type Printer", Proceedings of QES 2002 (the 10th Meeting for Reading Research Papers of Quality Engineering Society), pp. 170-173, 2002.

* cited by examiner

*Primary Examiner*—Madeleine A V Nguyen
(74) *Attorney, Agent, or Firm*—Oliff & Berridge, PLC

(57) ABSTRACT

A method of evaluating image pattern output accuracy based on numerical and objective criteria, by employing quality engineering. The method includes setting command signals which provide different distances from a reference point to at least three other points; outputting an image pattern which indicates reference coordinates of the reference point and distant measurement coordinates of the at least three points; optically reading the image pattern; obtaining data of the reference coordinates and the distant measurement coordinates from the read image pattern; calculating each distance between the obtained reference coordinates and the obtained distance measurement coordinates and outputting output signals which respectively provide the calculated distances; and calculating based on the command signals and the output signals, an S/N ratio for indicating a degree of dispersion of the output signals with respect to the command signals and a sensitivity of the output signals with respect to the command signals.

21 Claims, 17 Drawing Sheets

METHOD OF EVALUATING IMAGE PATTERN OUTPUT ACCURACY

BACKGROUND OF THE INVENTION

1. Field of the Invention

The present invention relates to a method of evaluating performance of printers, scanners, projectors, monitors, or the like, and in particular, relates to a method of evaluating image pattern output accuracy.

2. Description of the Related Art

In conventional methods of evaluating the performance of a printer, scanner, projector, monitor, or the like, an image pattern such as a print or an image is first output and a person observes the image pattern and determines with the senses whether the image pattern is fine, clear, and the like.

However, such conventional evaluations for printers, scanners, projectors, monitors, or the like is not performed based on numerical and objective criteria; therefore, the obtained results are based on the subjective criteria of the person who performs the evaluation.

SUMMARY OF THE INVENTION

In consideration of the above circumstances, an object of the-present invention is to provide a method of evaluating image pattern output accuracy and a method and system of printing accuracy, based on numerical and objective criteria, by employing quality engineering.

Therefore, the present invention provides a method of evaluating an image pattern output accuracy, comprising:
  a command signal setting step of setting command signals which respectively provide different distances from a reference point to at least three other points;
  an image pattern output step of outputting an image pattern which indicates reference coordinates of the reference point and distant measurement coordinates of said at least three points;
  an image pattern reading step of optically reading the image pattern;
  a coordinate data obtaining step of obtaining data of the reference coordinates and the distant measurement coordinates from the image pattern read in the image pattern reading step;
  a distance calculating step of calculating each distance between the reference coordinates obtained in the coordinate data obtaining step and the distance measurement coordinates obtained in the coordinate data obtaining step, and outputting output signals which respectively provide the calculated distances; and
  an S/N ratio and sensitivity calculating step of calculating based on the command signals and the output signals, at least one of an S/N ratio for indicating a degree of dispersion of the output signals with respect to the command signals and a sensitivity of the output signals with respect to the command signals.

The present invention also provides a method of evaluating an image pattern output accuracy, comprising:
  an image pattern output step of outputting an image pattern which indicates a color, based on command signals which respectively provide tristimulus values of the color;
  an image pattern reading step of optically reading the image pattern;
  a tristimulus value measuring step of measuring tristimulus values of the color in the image pattern read in the image pattern reading step and outputting output signals which respectively provide the measured tristimulus values; and
  an S/N ratio and sensitivity calculating step of calculating based on the command signals and the output signals, at least one of an S/N ratio for indicating a degree of dispersion of the output signals with respect to the command signals and a sensitivity of the output signals with respect to the command signals.

The present invention also provides a method of evaluating a printing accuracy, comprising:
  a command signal setting step of setting command signals which respectively provide different distances from a reference point to at least three other points;
  a printing step of printing an image pattern, which indicates reference coordinates of the reference point and distant measurement coordinates of said at least three points, on different papers by using a printing system, in a manner such that the reference point and said at least three points align in a direction substantially parallel to a paper feeding direction;
  an image pattern reading step of optically reading each image pattern printed on each of the different papers;
  a coordinate data obtaining step of obtaining data of the reference coordinates and the distant measurement coordinates from each image pattern on each paper read in the image pattern reading step;
  a distance calculating step of calculating for each paper, each distance between the reference coordinates obtained in the coordinate data obtaining step and the distance measurement coordinates obtained in the coordinate data obtaining step, and outputting output signals which respectively provide the calculated distances; and
  an S/N ratio and sensitivity calculating step of calculating based on the command signals and the output signals, at least one of an S/N ratio for indicating a degree of dispersion of the output signals with respect to the command signals and a sensitivity of the output signals with respect to the command signals.

The present invention also provides a method of evaluating a printing accuracy, comprising:
  a command signal setting step of setting command signals which respectively provide different distances from a reference point to at least three other points;
  a printing step of printing an image pattern, which indicates reference coordinates of the reference point and distant measurement coordinates of said at least three points, on different papers by using a printing system, in a manner such that the reference point and said at least three points align in a direction substantially parallel to a direction in which an inkhead of the printing system moves;
  an image pattern reading step of optically reading each image pattern printed on each of the different papers;
  a coordinate data obtaining step of obtaining data of the reference coordinates and the distant measurement coordinates from each image pattern on each paper read in the image pattern reading step;
  a distance calculating step of calculating for each paper, each distance between the reference coordinates obtained in the coordinate data obtaining step and the distance measurement coordinates obtained in the coordinate data obtaining step, and outputting output signals which respectively provide the calculated distances; and
  an S/N ratio and sensitivity calculating step of calculating based on the command signals and the output signals, at least one of an S/N ratio for indicating a degree of dispersion of the output signals with respect to the command signals and a sensitivity of the output signals with respect to the command signals.

The present invention also provides a method of evaluating a printing accuracy, comprising:

a command signal setting step of setting command signals which respectively provide different distances from a reference point to at least three other points;

a printing step of printing an image pattern, which indicates reference coordinates of the reference point and distant measurement coordinates of said at least three points, on different papers by using a printing system, in a manner such that the reference point and said at least three points align in a direction substantially parallel to a combined direction of a paper feeding direction and a direction in which an inkhead of the printing system moves;

an image pattern reading step of optically reading each image pattern printed on each of the different papers;

a coordinate data obtaining step of obtaining data of the reference coordinates and the distant measurement coordinates from each image pattern on each paper read in the image pattern reading step;

a distance calculating step of calculating for each paper, each distance between the reference coordinates obtained in the coordinate data obtaining step and the distance measurement coordinates obtained in the coordinate data obtaining step, and outputting output signals which respectively provide the calculated distances; and an S/N ratio and sensitivity calculating step of calculating based on the command signals and the output signals, at least one of an S/N ratio for indicating a degree of dispersion of the output signals with respect to the command signals and a sensitivity of the output signals with respect to the command signals.

In each method of evaluating a printing accuracy, it is possible that:

in the printing step, the image pattern is color-printed using a plurality of color elements which partially overlap with each other and produce a printed color; and the coordinate data obtaining step includes distinguishing each color element and measuring the reference coordinates and the distant measurement coordinates for each color element.

In each method of evaluating a printing accuracy, it is also possible that:

in the printing step, the image pattern is color-printed using a plurality of color elements which partially overlap with each other and produce a printed color; and in the coordinate data obtaining step, the reference coordinates and the distant measurement coordinates are measured at a position where the color elements are overlapped with each other.

The present invention also provides a method of evaluating a printing accuracy, comprising:

a command signal setting step of setting command signals which respectively provide different distances from an upper edge of a paper, from which the paper is fed into a printing system, to at least three positions defined in a vicinity of the upper edge;

a printing step of printing an image pattern, which indicates said at least three positions, on different papers by using the printing system;

an image pattern reading step of optically reading each image pattern printed on each of the different papers;

a distance measuring step of measuring for each paper, distances from the upper edge to said at least three positions and outputting output signals which respectively provide the measured distances; and an S/N ratio and sensitivity calculating step of calculating based on the command signals and the output signals, at least one of an S/N ratio for indicating a degree of dispersion of the output signals with respect to the command signals and a sensitivity of the output signals with respect to the command signals.

The present invention also provides a method of evaluating a printing accuracy, comprising:

a command signal setting step of setting command signals which respectively provide different distances from a lower edge of a paper, which is an opposite edge to an upper edge from which the paper is fed into a printing system, to at least three positions defined in a vicinity of the lower edge;

a printing step of printing an image pattern, which indicates said at least three positions, on different papers by using the printing system;

an image pattern reading step of optically reading each image pattern printed on each of the different papers;

a distance measuring step of measuring for each paper, distances from the lower edge to said at least three positions and outputting output signals which respectively provide the measured distances; and an S/N ratio and sensitivity calculating step of calculating based on the command signals and the output signals, at least one of an S/N ratio for indicating a degree of dispersion of the output signals with respect to the command signals and a sensitivity of the output signals with respect to the command signals.

The present invention also provides a method of evaluating a printing accuracy, comprising:

a command signal setting step of setting command signals which respectively provide different distances from an upper edge of a paper, from which the paper is fed into a printing system, to a first set of at least three positions, and different distances from a lower edge of a paper, which is an opposite edge to the upper edge, to a second set of at least three positions;

a printing step of printing an image pattern on different papers by using the printing system, where the image pattern on each paper indicates the first set of at least three positions in a vicinity of one of right and left sides of the paper and the second set of at least three positions in a vicinity of the other of said right and left sides of the paper;

an image pattern reading step of optically reading each image pattern printed on each of the different papers;

a distance measuring step of measuring for each paper, distances from the upper edge to the first set of at least three positions and distances from the lower edge to the second set of at least three positions, and outputting output signals which respectively provide the measured distances; and an S/N ratio and sensitivity calculating step of calculating based on the command signals and the output signals, at least one of an S/N ratio for indicating a degree of dispersion of the output signals with respect to the command signals and a sensitivity of the output signals with respect to the command signals.

The present invention also provides a method of evaluating a printing accuracy, comprising:

a printing step of printing an image pattern on different papers by using a printing system, where the image pattern on each paper includes at least three indices which align in a paper feeding direction based on a command signal which commands a regular interval between the indices;

an image pattern reading step of optically reading each image pattern printed on each of the different papers;

an interval measuring step of measuring for each paper, intervals between the indices and outputting output signals which respectively provide the measured intervals; and an S/N ratio and sensitivity calculating step of calculating based on the command signal and the output signals, at least one of an S/N ratio for indicating a degree of dispersion of the output signals with respect to the command signal and a sensitivity of the output signals with respect to the command signal.

The present invention also provides a method of evaluating an image pattern output accuracy, comprising:

a printing step of printing on a paper, an image pattern which indicates a color, based on command signals which respectively provide tristimulus values of the color;

an image pattern reading step of optically reading the image pattern printed on the paper;

a tristimulus value measuring step of measuring tristimulus values of the color in the image pattern read in the image pattern reading step and outputting output signals which respectively provide the measured tristimulus values; and an S/N ratio and sensitivity calculating step of calculating based on the command signals and the output signals, at least one of an S/N ratio for indicating a degree of dispersion of the output signals with respect to the command signals and a sensitivity of the output signals with respect to the command signals.

The present invention also provides a system of evaluating a printing accuracy, comprising:

a command signal setting section for setting command signals which respectively provide different distances from a reference point to at least three other points;

a printing section for printing an image pattern, which indicates reference coordinates of the reference point and distant measurement coordinates of said at least three points, on different papers by using a printing system, in a manner such that the reference point and said at least three points align in a direction substantially parallel to a paper feeding direction;

an image pattern reading section for optically reading each image pattern printed on each of the different papers;

a coordinate data obtaining section for obtaining data of the reference coordinates and the distant measurement coordinates from each image pattern on each paper read by the image pattern reading section;

a distance calculating section for calculating for each paper, each distance between the reference coordinates obtained by the coordinate data obtaining section and the distance measurement coordinates obtained by the coordinate data obtaining section, and outputting output signals which respectively provide the calculated distances; and an S/N ratio and sensitivity calculating section for calculating based on the command signals and the output signals, at least one of an S/N ratio for indicating a degree of dispersion of the output signals with respect to the command signals and a sensitivity of the output signals with respect to the command signals.

The present invention also provides a system of evaluating a printing accuracy, comprising:

a command signal setting section for setting command signals which respectively provide different distances from a reference point to at least three other points;

a printing section for printing an image pattern, which indicates reference coordinates of the reference point and distant measurement coordinates of said at least three points, on different papers by using a printing system, in a manner such that the reference point and said at least three points align in a direction substantially parallel to a direction in which an inkhead of the printing system moves;

an image pattern reading section for optically reading each image pattern printed on each of the different papers;

a coordinate data obtaining section for obtaining data of the reference coordinates and the distant measurement coordinates from each image pattern on each paper read by the image pattern reading section;

a distance calculating section for calculating for each paper, each distance between the reference coordinates obtained by the coordinate data obtaining section and the distance measurement coordinates obtained by the coordinate data obtaining section, and outputting output signals which respectively provide the calculated distances; and an S/N ratio and sensitivity calculating section for calculating based on the command signals and the output signals, at least one of an S/N ratio for indicating a degree of dispersion of the output signals with respect to the command signals and a sensitivity of the output signals with respect to the command signals.

The present invention also provides a system of evaluating a printing accuracy, comprising:

a command signal setting section for setting command signals which respectively provide different distances from a reference point to at least three other points;

a printing section for printing an image pattern, which indicates reference coordinates of the reference point and distant measurement coordinates of said at least three points, on different papers by using a printing system, in a manner such that the reference point and said at least three points align in a direction substantially parallel to a combined direction of a paper feeding direction and a direction in which an inkhead of the printing system moves;

an image pattern reading section for optically reading each image pattern printed on each of the different papers;

a coordinate data obtaining section for obtaining data of the reference coordinates and the distant measurement coordinates from each image pattern on each paper read by the image pattern reading section;

a distance calculating section for calculating for each paper, each distance between the reference coordinates obtained by the coordinate data obtaining section and the distance measurement coordinates obtained by the coordinate data obtaining section, and outputting output signals which respectively provide the calculated distances; and an S/N ratio and sensitivity calculating section for calculating based on the command signals and the output signals, at least one of an S/N ratio for indicating a degree of dispersion of the output signals with respect to the command signals and a sensitivity of the output signals with respect to the command signals.

In each system of evaluating a printing accuracy, it is possible that:

the printing section color-prints the image pattern by using a plurality of color elements which partially overlap with each other and produce a printed color; and the coordinate data obtaining section distinguishes each color element and measures the reference coordinates and the distant measurement coordinates for each color element.

In each system of evaluating a printing accuracy, it is also possible that:

the printing section color-prints the image pattern by using a plurality of color elements which partially overlap with each other and produce a printed color; and the coordinate data obtaining section measures the reference coordinates and the distant measurement coordinates at a position where the color elements are overlapped with each other.

The present invention also provides a system of evaluating a printing accuracy, comprising:

a command signal setting section for setting command signals which respectively provide different distances from an upper edge of a paper, from which the paper is fed into a printing system, to at least three positions defined in a vicinity of the upper edge;

a printing section for printing an image pattern, which indicates said at least three positions, on different papers by using the printing system;

an image pattern reading section for optically reading each image pattern printed on each of the different papers;

a distance measuring section for measuring for each paper, distances from the upper edge to said at least three positions and outputting output signals which respectively provide the measured distances; and an S/N ratio and sensitivity calculating section for calculating based on the command signals and the output signals, at least one of an S/N ratio for indicating a degree of dispersion of the output signals with respect to the command signals and a sensitivity of the output signals with respect to the command signals.

The present invention also provides a system of evaluating a printing accuracy, comprising:

a command signal setting section for setting command signals which respectively provide different distances from a lower edge of a paper, which is an opposite edge to an upper edge from which the paper is fed into a printing system, to at least three positions defined in a vicinity of the lower edge;

a printing section for printing an image pattern, which indicates said at least three positions, on different papers by using the printing system;

an image pattern reading section for optically reading each image pattern printed on each of the different papers;

a distance measuring section for measuring for each paper, distances from the lower edge to said at least three positions and outputting output signals which respectively provide the measured distances; and an S/N ratio and sensitivity calculating section for calculating based on the command signals and the output signals, at least one of an S/N ratio for indicating a degree of dispersion of the output signals with respect to the command signals and a sensitivity of the output signals with respect to the command signals.

The present invention also provides a system of evaluating a printing accuracy, comprising:

a command signal setting section for setting command signals which respectively provide different distances from an upper edge of a paper, from which the paper is fed into a printing system, to a first set of at least three positions, and different distances from a lower edge of a paper, which is an opposite edge to the upper edge, to a second set of at least three positions;

a printing section for printing an image pattern on different papers by using the printing system, where the image pattern on each paper indicates the first set of at least three positions in a vicinity of one of right and left sides of the paper and the second set of at least three positions in a vicinity of the other of said right and left sides of the paper;

an image pattern reading section for optically reading each image pattern printed on each of the different papers;

a distance measuring section for measuring for each paper, distances from the upper edge to the first set of at least three positions and distances from the lower edge to the second set of at least three positions, and outputting output signals which respectively provide the measured distances; and an S/N ratio and sensitivity calculating section for calculating based on the command signals and the output signals, at least one of an S/N ratio for indicating a degree of dispersion of the output signals with respect to the command signals and a sensitivity of the output signals with respect to the command signals.

The present invention also provides a system of evaluating a printing accuracy, comprising:

a printing section for printing an image pattern on different papers by using a printing system, where the image pattern on each paper includes at least three indices which align in a paper feeding direction based on a command signal which commands a regular interval between the indices;

an image pattern reading section for optically reading each image pattern printed on each of the different papers;

an interval measuring section for measuring for each paper, intervals between the indices and outputting output signals which respectively provide the measured intervals; and an S/N ratio and sensitivity calculating section for calculating based on the command signal and the output signals, at least one of an S/N ratio for indicating a degree of dispersion of the output signals with respect to the command signal and a sensitivity of the output signals with respect to the command signal.

The present invention also provides a system of evaluating an image pattern output accuracy, comprising:

a printing section for printing on a paper, an image pattern which indicates a color, based on command signals which respectively provide tristimulus values of the color;

an image pattern reading section for optically reading the image pattern printed on the paper;

a tristimulus value measuring section for measuring tristimulus values of the color in the image pattern read by the image pattern reading section and outputting output signals which respectively provide the measured tristimulus values; and an S/N ratio and sensitivity calculating section for calculating based on the command signals and the output signals, at least one of an S/N ratio for indicating a degree of dispersion of the output signals with respect to the command signals and a sensitivity of the output signals with respect to the command signals.

According to the present invention, image pattern output accuracy or printing accuracy can be estimated based on numerical and objective criteria.

DESCRIPTION OF THE PREFERRED EMBODIMENTS

Hereinafter, a method of evaluating the image pattern output accuracy of a printer (i.e., a printing system) as an embodiment according to the present invention will be explained with reference to the drawings.

Figure 1:
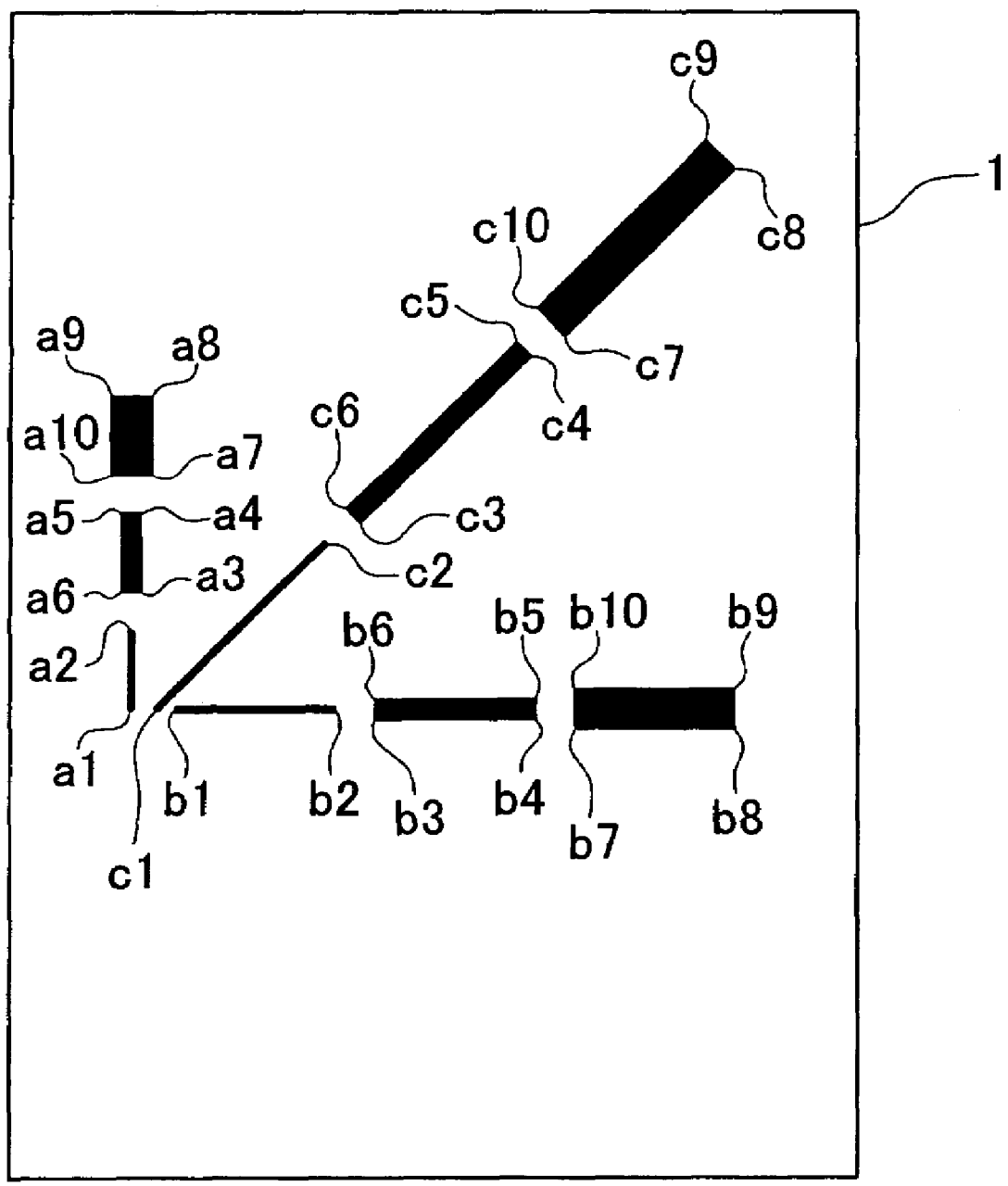
FIG. 1 is a diagram showing an image pattern for evaluating the accuracy for image printing in black-and-white printing, in an embodiment according to the present invention.

FIG. 1 is a diagram showing an image pattern 1 for evaluating the accuracy for image printing (i.e., how accurately the image is printed, without distortion or positional shift) in black-and-white printing. This image pattern 1 has reference coordinates of point a1, and a straight line a1-a2 is printed, where a2 is another point whose coordinates are defined on the vertical direction from point a1. On the extension direction from the line a1-a2, two rectangles having different sizes are printed: one is formed by four points a3, a4, a5, and a6, and the other is formed by four points a7, a8, a9, and a10. The image pattern 1 also has reference coordinates of point b1, and a straight line b1-b2 is printed, where b2 is another point whose coordinates are defined on the horizontal direction from point b1. On the extension direction from the line b1-b2, two rectangles having different sizes are printed: one is formed by four points b3, b4, b5, and b6, and the other is formed by four points b7, b8, b9, and b10. The image pattern 1 also has reference coordinates of point c1, and a straight line c1-c2 is printed, where c2 is another point whose coordinates are defined on the direction which is inclined by 45° from both vertical and horizontal axes, that is, on the vertical/horizontal-combined direction. On the extension direction from the line c1-c2, two rectangles having different sizes are printed: one is formed by four points c3, c4, c5, and c6, and the other is formed by four points c7, c8, c9, and c10.

The coordinates of these points a1 to a10, b1 to b10, and c1 to c10 are input and stored in advance in a computer (e.g., a personal computer). Based on the input coordinates, the image pattern 1 may be black-and-white-printed using a printer on different papers such as a plain paper and a heat sensitive paper.

Here, the computer has a coordinate data obtaining section, a distance calculating section, an S/N ratio and sensitivity calculating section, and a tristimulus value measuring section. Based on command signals, each including distances between reference coordinates and other coordinates for measuring distance (i.e., distance measurement coordinates), an image pattern for indicating the reference coordinates and the distance measurement coordinates is printed by a printer (i.e., a printing device (or an image pattern output device)). This printed image pattern is optically read using a scanner, a three-dimensional measurement device, or the like (i.e., a reading device) and is input into the computer, and data of the reference coordinates and the distance measurement coordinates, indicated by the image pattern, are obtained by the coordinate data obtaining section. For example, in order to obtain the reference coordinates and the distance measurement coordinates with reference to a printed straight line in the image pattern, the coordinate data obtaining section determines the coordinates of one end of the line as the reference coordinates, and the coordinates of the other end as the distance measurement coordinates.

The computer calculates each distance between the reference coordinates and the distance measurement coordinates (e.g., distance 1 between the reference coordinates and the first distance measurement coordinates, distance 2 between the reference coordinates and the second distance measurement coordinates, . . . ) by using the distance calculating section and outputs the calculated distances as output signals. The S/N ratio and sensitivity calculating section calculates (i) the S/N ratio which indicates the dispersion of the output signals with respect to the command signals and (ii) the sensitivity of the output signals with respect to the command signals. Accordingly, the performance of the printing system which printed the image pattern can be evaluated.

In addition, an image pattern is printed by a printing system (i.e., a printing device (or an image pattern output device)) based on command signals including the tristimulus values, and data obtained by optically reading the image pattern by using a scanner, a three-dimensional measurement device, or the like (i.e., a reading device) are input into the computer. The tristimulus value measuring section in the computer measures the tristimulus values of the colors of the image pattern, and the measured data are output as output signals, and the S/N ratio and sensitivity calculating section calculates (i) the S/N ratio which indicates the dispersion of the output signals with respect to the command signals and (ii) the sensitivity of the output signals with respect to the command signals. Accordingly, the performance of the printing system which printed the image pattern can be evaluated.

For example, the image pattern 1 is printed on a plain paper and on a heat sensitive paper. The printed image patterns are each read using a scanner or a three-dimensional measurement device (i.e., a reading device), and the read data are input into the computer. The computer then calculates, for each printed image pattern, (i) nine distances between a1-a2, a1-a3, a1-a4, a1-a5, a1-a6, a1-a7, a1-a8, a1-a9, and a1-a10 (i.e., distance between a1-a2, distance between a1-a3, . . . ), (ii) nine distances between b1-b2, b1-b3, b1-b4, b1-b5, b1-b6, b1-b7, b1-b8, b1-b9, and b1-b10, and (iii) nine distances between c1-c2, c1-c3, c1-c4, c1-c5, c1-c6, c1-c7, c1-c8, c1-c9, and c1-c10.

The computer defines correspondence between (i) the above calculated distances (i.e., 9×3 distances) for each printed paper and (ii) the distances between a1-a2, . . . , a1-a10, b1-b2, . . . , b1-b10, c1-c2, . . . , c1-c10 which are input in advance into the computer for printing the image pattern 1. Here, the distances between the coordinates, which are input in advance into the computer, are provided (or treated) as command signals, and the distances between the coordinates, which are calculated after reading the printed image pattern 1 by the computer, are provided (or treated) as output signals. The accuracy for image printing (i.e., how accurately the image is printed, without distortion or positional shift) in the black-and-white printing using a printer is evaluated with reference to three kinds of distance data, where a command signal and two output signals with respect to two kinds of different printing papers are produced for each distance. That is, the S/N ratio ($\eta$) and the sensitivity (S) are measured based on the command signals and the output signals, by using a method explained below. Accordingly, it is possible to evaluate whether the accuracy for image printing (in black-and-white printing using a printer) is satisfactory. In the above embodiment, it is assumed that the accuracy for image reading using a computer via a scanner (i.e., how accurately the image pattern is read, without distortion or positional shift) is sufficiently high.

In the image pattern 1, nine distances in each of the vertical, horizontal, and vertical/horizontal-combined direction are measured. In order to evaluate the linearity between the command signal and the output signal, three or more command signals and corresponding output signals are necessary, and a larger number of the command signals (and the corresponding output signals) are preferable so as to improve the reliability on the evaluation for the linearity. Therefore, instead of printing the lines and rectangles as shown in the image pattern 1, dots may be printed on each of the vertical, horizontal, and vertical/horizontal-combined direction, so as to measure at least three distances from the reference coordinates.

In the above embodiment, the image pattern 1 is used for evaluating the accuracy for image printing (i.e., with respect to image distortion or positional shift) in. black-and-white printing using a printer. However, a scanner may be used for reading the image pattern 1 so as to input the image pattern into the computer. In this case, data of the image pattern are analyzed on the computer by the above-explained method, thereby evaluating the printing accuracy with respect to image distortion or positional shift when a black-and-white print is read using the scanner into the computer. Here, it is assumed that the printing accuracy of the printing system for printing the image pattern 1 is sufficiently high.

In another pattern-reading method, digital data for the image pattern 1 are produced using a computer, and a corresponding image is projected onto a wall surface by using a projector. The projected image is read using a camera, and the read data are analyzed on the computer by using the above-explained method, thereby evaluating the projecting accuracy with respect to image distortion or positional shift when the projector projects a black-and-white image onto the wall surface.

In another pattern-reading method, digital data for the image pattern 1 are produced using the computer, and a corresponding image is displayed on a display of a monitor. The displayed image is read using a camera, and the read data are analyzed on the computer by using the above-explained method, thereby evaluating the displaying accuracy with respect to image distortion or positional shift when the monitor displays a black-and-white image.

Figure 2:
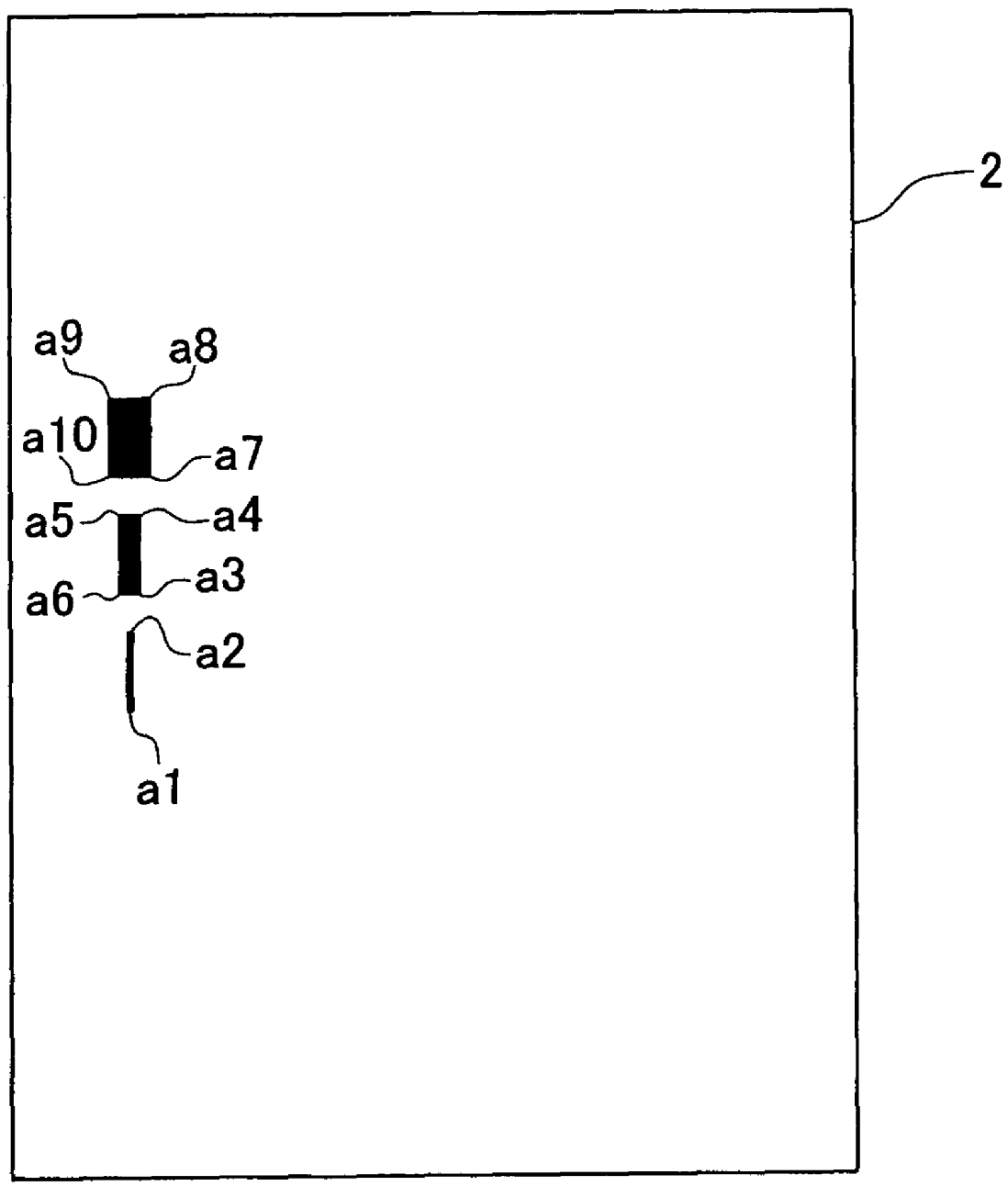
FIG. 2 is a diagram showing an image pattern used for evaluating the accuracy for constant-speed paper feeding in black-and-white printing, in an embodiment according to the present invention.

Below, FIG. 2 will be explained. FIG. 2 is a diagram showing an image pattern 2 used for evaluating the accuracy for constant-speed paper feeding in black-and-white printing. This image pattern 2 is equivalent to a pattern in the vertical direction in FIG. 1, which includes a straight line and two rectangles; that is, the image pattern 2 has reference coordinates of point a1, and a straight line a1-a2 is printed, where a2 is another point whose coordinates are defined on the vertical direction from point a1. On the extension direction from the line a1-a2, two rectangles having different sizes are printed: one is formed by four points a3, a4, a5, and a6, and the other is formed by four points a7, a8, a9, and a10.

The coordinates of these points a1 to a10 are input and stored in advance in a computer (e.g., a personal computer). Based on the input coordinates, the image pattern 2 may be black-and-white-printed using a printer on different papers such as a plain paper and a heat sensitive paper.

Here, the image pattern 2 is printed on a plain paper and on a heat sensitive paper. The printed image patterns are each read using a scanner or a three-dimensional measurement device, and the read data are input into the computer. The computer then calculates, for each printed image pattern, nine distances between a1-a2, a1-a3, a1-a4, a1-a5, a1-a6, a1-a7, a1-a8, a1-a9, and a1-a10. The computer defines correspondence between the above calculated distances for each printed paper and the distances between a1-a2, . . . , a1-a10 which are input in advance into the computer for printing the image pattern 2. Here, the distances between the coordinates, which are input in advance into the computer, are provided as command signals, and the distances between the coordinates, which are calculated after reading the printed image pattern 2 by the computer, are provided as output signals. The accuracy for constant-speed paper feeding (i.e., how accurately the paper is fed at a constant speed) in the black-and-white printing is evaluated with reference to three kinds of distance data, where a command signal and two output signals with respect to two kinds of different printing papers are produced for each distance. That is, the S/N ratio (η) and the sensitivity (S) are measured based on the command signals and the output signals, by using a method explained below. Accordingly, it is possible to evaluate whether the accuracy for constant-speed paper feeding (in black-and-white printing using a printer) is satisfactory.

In the image pattern 2, nine distances in the vertical direction are measured. In order to evaluate the linearity between the command signal and the output signal, three or more command signals and corresponding output signals are necessary, and a larger number of the command signals (and the corresponding output signals) are preferable so as to improve the reliability on the evaluation for the linearity. Therefore, instead of printing the line and rectangles as shown in the image pattern 2, dots may be printed in the vertical direction, so as to measure at least three distances from the reference coordinates. In addition, the image pattern 2 is equivalent to the image pattern including a straight line and two rectangles in the vertical direction in the image pattern 1; thus, the accuracy for constant-speed paper feeding (in the vertical direction) in black-and-white printing can also be evaluated by using the image pattern 1.

In the above, an example for evaluating how accurately the constant-speed paper feeding is performed by using the image pattern 2 has been explained. However, distortion of a belt for moving a lens in a scanner, or distortion of the lens itself may be evaluated with respect to the above-explained paper feeding direction (i.e., the vertical direction). That is, when the image pattern 2 is read via a scanner by the computer and data of the image pattern are analyzed on the computer by the above-explained method, it is possible to evaluate the distortion of the belt for moving the lens in the scanner or the distortion of the lens itself, where the distortion is produced when a black-and-white print is read by a computer via the scanner. Here, it is assumed that the printing accuracy of the printing system for printing the image pattern 2 is sufficiently high.

In addition, distortion of a lens in a projector, or combined lamps in the projector, may be evaluated with respect to the above-explained paper feeding direction (i.e., the vertical direction). That is, digital data for the image pattern 2 are produced using a computer, and a corresponding image is projected onto a wall surface by using a projector. The projected image is read using a camera, and the read data are analyzed on the computer by using the above-explained method, thereby evaluating the distortion of the lens or the combination of lamps when a black-and-white image is projected onto the wall surface by using the projector.

In addition, distortion of an output image from a monitor or the combination of luminous colors on a display of the monitor may be evaluated with respect to the above-explained paper feeding direction (i.e., the vertical direction). That is, digital data for the image pattern 2 are produced using the computer, and a corresponding image is displayed on a display of a monitor. The displayed image is read using a camera, and the read data are analyzed on the computer by using the above-explained method, thereby evaluating the distortion of an output image from the monitor or the combination of luminous colors on the display of the monitor when the monitor displays a black-and-white image.

Figure 3:
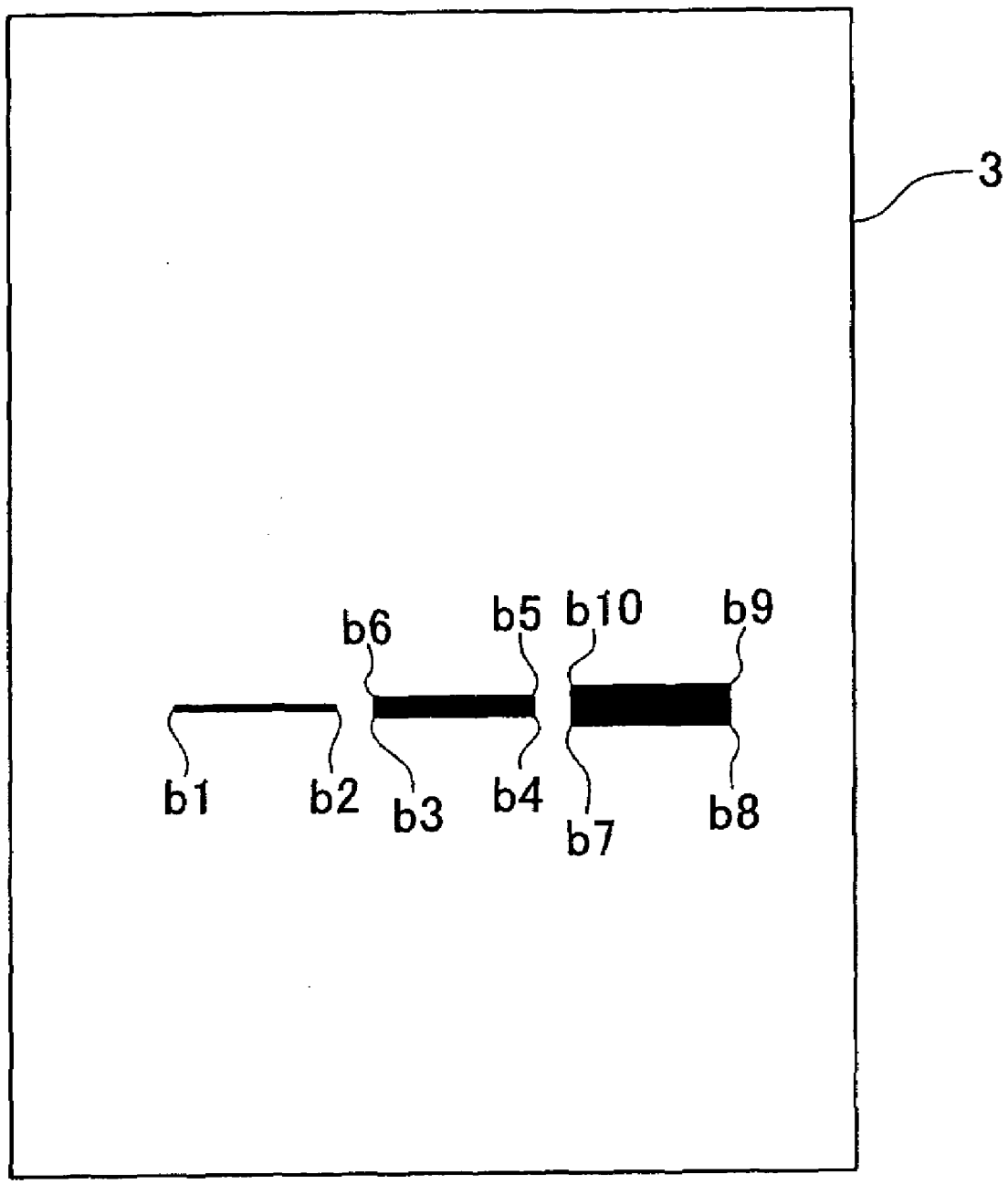
FIG. 3 is a diagram showing an image pattern used for evaluating the accuracy for inkhead motion in a direction in which the inkhead moves (i.e., the horizontal direction) in black-and-white printing, in an embodiment according to the present invention.

Below, FIG. 3 will be explained. FIG. 3 is a diagram showing an image pattern 3 used for evaluating the accuracy for inkhead motion in a direction in which the inkhead moves (here, the horizontal direction) in black-and-white printing using a printer. This image pattern 3 is equivalent to a pattern in the horizontal direction in FIG. 1, which includes a straight line and two rectangles; that is, the image pattern 3 has reference coordinates of point b1, and a straight line b1-b2 is printed, where b2 is another point whose coordinates are defined on the horizontal direction from point b1. On the extension direction from the line b1-b2, two rectangles having different sizes are printed: one is formed by four points b3, b4, b5, and b6, and the other is formed by four points b7, b8, b9, and b10.

The coordinates of these points b1 to b10 are input and stored in advance in a computer (e.g., a personal computer). Based on the input coordinates, the image pattern 3 may be black-and-white-printed using a printer on different papers such as a plain paper and a heat sensitive paper.

Here, the image pattern 3 is printed on a plain paper and on a heat sensitive paper. The printed image patterns are each read using a scanner or a three-dimensional measurement device, and the read data are input into the computer. The computer then calculates, for each printed image pattern, nine distances between b1-b2, b1-b3, b1-b4, b1-b5, b1-b6, b1-b7, b1-b8, b1-b9, and b1-b10. The computer defines correspondence between the above calculated distances for each printed paper and the distances between b1-b2, . . . , b1-b10 which are input in advance into the computer for printing the image pattern 3. Here, the distances between the coordinates, which are input in advance into the computer, are provided as command signals, and the distances between the coordinates, which are calculated after reading the printed image pattern 3 by the computer, are provided as output signals. The accuracy for the inkhead motion in the inkhead moving direction in the black-and-white printing is evaluated with reference to three kinds of distance data, where a command signal and two output signals with respect to two kinds of different printing papers are produced for each distance. That is, the S/N ratio (η) and the sensitivity (S) are measured based on the command signals and the output signals, by using a method explained below. Accordingly, it is possible to evaluate whether the accuracy for the inkhead motion (in the horizontal direction) is satisfactory.

In the image pattern 3, nine distances in the horizontal direction are measured. In order to evaluate the linearity between the command signal and the output signal, three or more command signals and corresponding output signals are necessary, and a larger number of the command signals (and the corresponding output signals) are preferable so as to improve the reliability of the evaluation for the linearity. Therefore, instead of printing the line and rectangles as shown in the image pattern 3, dots may be printed in the horizontal direction, so as to measure at least three distances from the reference coordinates. In addition, the image pattern 3 is equivalent to the image pattern including a straight line and two rectangles in the image pattern 1; thus, the accuracy for the inkhead motion in the inkhead moving direction (i.e., the horizontal direction) can also be evaluated by using the image pattern 1.

In the above, an example for evaluating the inkhead motion in the inkhead moving direction (i.e., the horizontal direction) by using the image pattern 3, in black-and-white printing using a printer, has been explained. However, distortion of a belt for moving a lens in a scanner, or distortion of the lens itself may be evaluated with respect to the above-explained inkhead moving direction (i.e., the horizontal direction). That is, when the image pattern 3 is read via a scanner by the computer and data of the image pattern are analyzed on the computer by the above-explained method, it is possible to evaluate the distortion of the belt for moving the lens in the scanner or the distortion of the lens itself, where the distortion is produced when a black-and-white print is read by a computer via the scanner. Here, it is assumed that the printing accuracy of the printing system for printing the image pattern 3 is sufficiently high.

In addition, distortion of a lens in a projector, or combined lamps in the projector, may be evaluated with respect to the above-explained inkhead moving direction (i.e., the horizontal direction). That is, digital data for the image pattern 3 are produced using a computer, and a corresponding image is projected onto a wall surface by using a projector. The projected image is read using a camera, and the read data are analyzed on the computer by using the above-explained method, thereby evaluating the distortion of the lens or the combination of lamps when a black-and-white image is projected onto the wall surface by using the projector.

In addition, distortion of an output image from a monitor or the combination of luminous colors on a display of the monitor may be evaluated with respect to the above-explained inkhead moving direction (i.e., the horizontal direction). That is, digital data for the image pattern 3 are produced using the computer, and a corresponding image is displayed on a display of a monitor. The displayed image is read using a camera, and the read data are analyzed on the computer by using the above-explained method, thereby evaluating the distortion of an output image from the monitor or the combination of luminous colors on the display of the monitor when the monitor displays a black-and-white image.

Figure 4:
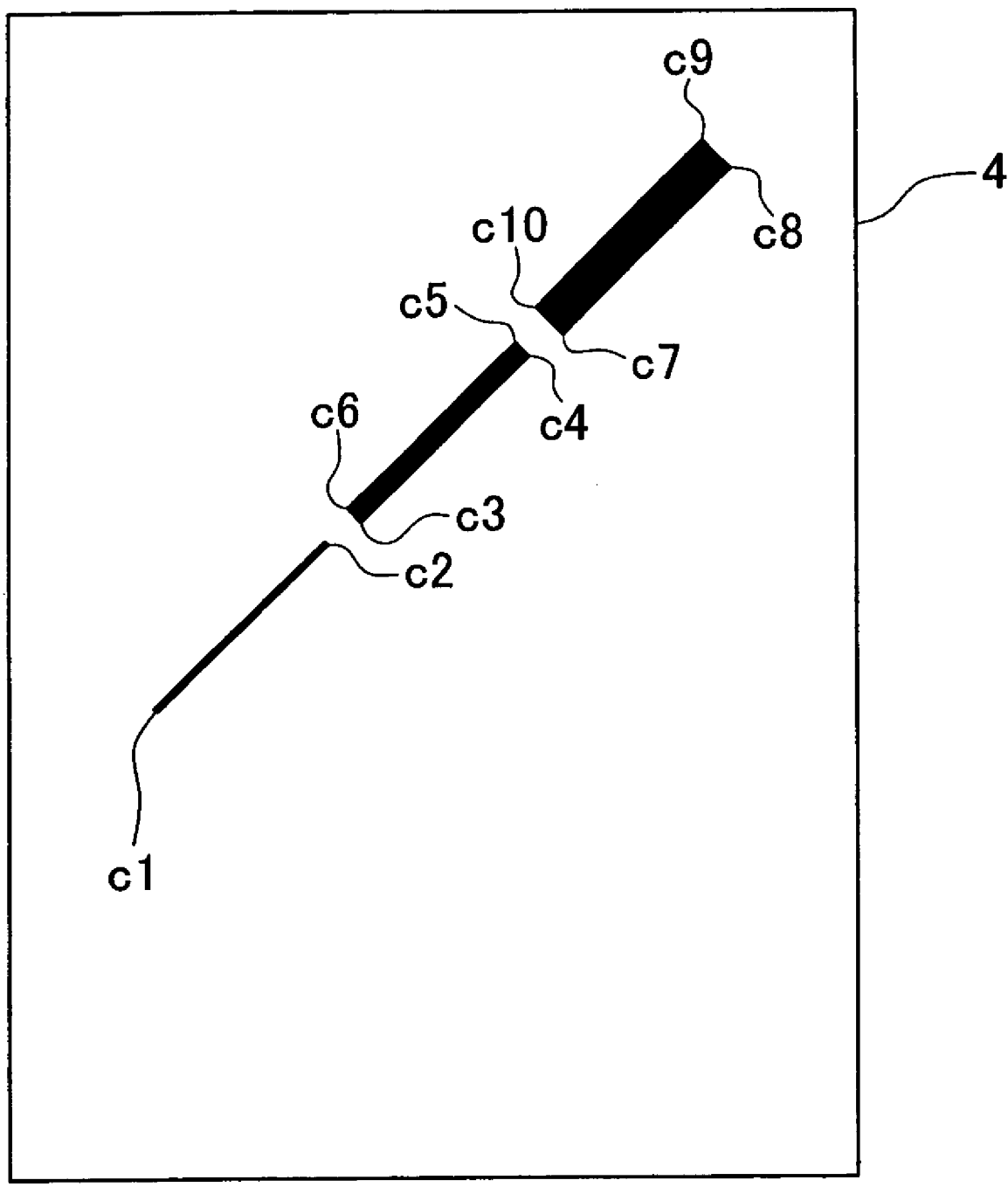
FIG. 4 is a diagram showing an image pattern used for synthetically evaluating the accuracy for paper feeding in the paper feeding direction (i.e., the vertical direction) and the accuracy for inkhead motion in the inkhead moving direction (i.e., the horizontal direction) in black-and-white printing, in an embodiment according to the present invention.

Below, FIG. 4 will be explained. FIG. 4 is a diagram showing an image pattern 4 used for synthetically evaluating the accuracy for paper feeding in the paper feeding direction (i.e., the vertical direction) and the accuracy for inkhead motion in the inkhead moving direction (i.e., the horizontal direction), that is, a synthetic accuracy in black-and-white printing. This image pattern 4 is equivalent to a pattern in the vertical/horizontal-combined direction in FIG. 1, which includes a straight line and two rectangles; that is, the image pattern 4 has reference coordinates of point c1, and a straight line c1-c2 is printed, where c2 is another point whose coordinates are defined on the vertical/horizontal-combined direction (which is inclined by 45° from both vertical and horizontal directions) from point c1. On the extension direction from the line c1-c2, two rectangles having different sizes are printed: one is formed by four points c3, c4, c5, and c6, and the other is formed by four points c7, c8, c9, and c10.

The coordinates of these points c1 to c10 are input and stored in advance in a computer (e.g., a personal computer). Based on the input coordinates, the image pattern 4 may be black-and-white-printed using a printer on different papers such as a plain paper and a heat sensitive paper.

Here, the image pattern 4 is printed on a plain paper and on a heat sensitive paper. The printed image patterns are each read using a scanner or a three-dimensional measurement device, and the read data are input into the computer. The computer then calculates, for each printed image pattern, nine distances between c1-c2, c1-c3, c1-c4, c1-c5, c1-c6, c1-c7, c1-c8, c1-c9, and c1-c10. The computer defines correspondence between the above calculated distances for each printed paper and the distances between c1-c2, ..., c1-c10 which are input in advance into the computer for printing the image pattern 4. Here, the distances between the coordinates, which are input in advance into the computer, are provided as command signals, and the distances between the coordinates, which are calculated after reading the printed image pattern 4 by the computer, are provided as output signals. Then, the accuracies in the black-and-white printing, that is, (i) the accuracy whether the paper is fed at a constant speed and (ii) the accuracy whether the inkhead motion is accurately performed based on the coordinates which are input in advance into the computer, are synthetically evaluated with reference to three kinds of distance data, where a command signal and two output signals with respect to two kinds of different printing papers are produced for each distance. That is, the S/N ratio ($\eta$) and the sensitivity (S) are measured based on the command signals and the output signals, by using a method explained below. Accordingly, it is possible to synthetically evaluate, for black-and-white printing using a printer, the accuracy for paper feeding in the paper feeding direction and the accuracy for the inkhead motion in the inkhead moving direction.

In the image pattern 4, nine distances in the vertical/horizontal-combined direction are measured. In order to evaluate the linearity between the command signal and the output signal, three or more command signals and corresponding output signals are necessary, and a larger number of the command signals (and the corresponding output signals) are preferable so as to improve the reliability on the evaluation for the linearity. Therefore, instead of printing the line and rectangles as shown in the image pattern 4, dots may be printed in the vertical/horizontal-combined direction, so as to measure at least three distances from the reference coordinates of point c1. In addition, the image pattern 4 is equivalent to the image pattern including a straight line and two rectangles in the vertical/horizontal-combined direction in the image pattern 1; thus, the synthetic accuracy for the paper feeding in the paper feeding direction (i.e., the vertical direction) and for the inkhead motion in the inkhead moving direction (i.e., the horizontal direction) in black-and-white printing using a printer can also be evaluated by using the image pattern 1.

In the above, an example for synthetically evaluating the paper feeding in the paper feeding direction (i.e., the vertical direction) and the inkhead motion in the inkhead moving direction (i.e., the horizontal direction) by using the image pattern 4 in black-and-white printing using a printer has been explained. However, each of the above-explained paper feeding direction (i.e., the vertical direction) and the inkhead moving direction (i.e., the horizontal direction) may be used for evaluating with respect to the relevant direction, distortion of a belt for moving a lens in a scanner or distortion of the lens itself. That is, when the image pattern 4 is read via a scanner by the computer and data of the image pattern are analyzed on the computer by the above-explained method, it is possible to evaluate the distortion of the belt for moving the lens in the scanner or the distortion of the lens itself, where the distortion is produced when a black-and-white print is read by a computer via the scanner. Here, it is assumed that the printing accuracy of the printing system for printing the image pattern 4 is sufficiently high.

In addition, each of the above-explained paper feeding direction (i.e., the vertical direction) and the inkhead moving direction (i.e., the horizontal direction) may be used for evaluating with respect to the relevant direction, distortion of a lens in a projector, or combined lamps in the projector. That is, digital data for the image pattern 4 are produced using a computer, and a corresponding image is projected onto a wall surface by using a projector. The projected image is read using a camera, and the read data are analyzed on the computer by using the above-explained method, thereby evaluating the distortion of the lens or the combination of lamps when a black-and-white image is projected onto the wall surface by using the projector.

In addition, each of the above-explained paper feeding direction (i.e., the vertical direction) and the inkhead moving direction (i.e., the horizontal direction) may be used for evaluating distortion of an output image from a monitor or the combination of luminous colors on a display of the monitor with respect to the relevant direction. That is, digital data for the image pattern 4 are produced using the computer, and a corresponding image is displayed on a display of a monitor. The displayed image is read using a camera, and the read data are analyzed on the computer by using the above-explained method, thereby evaluating the distortion of an output image from the monitor or the combination of luminous colors on the display of the monitor when the monitor displays a black-and-white image.

Figure 5:
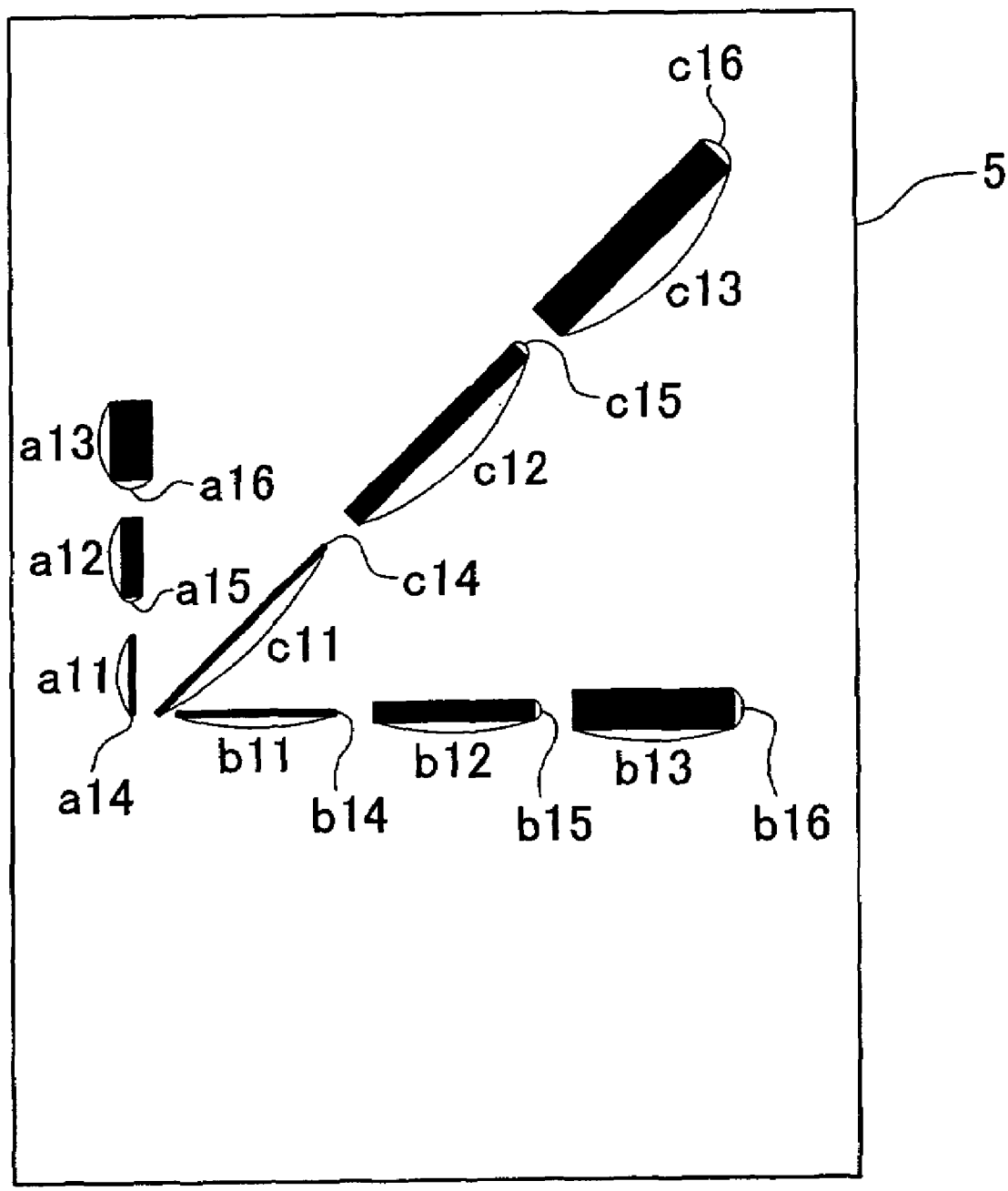
FIG. 5 is a diagram showing an image pattern for evaluating output accuracy for proportional expansion and output accuracy for proportional contraction in black-and-white printing, in an embodiment according to the present invention.

Below, FIG. 5 will be explained. FIG. 5 is a diagram showing an image pattern 5 for evaluating output accuracy for proportional expansion and output accuracy for proportional contraction in black-and-white printing. Although the image pattern 5 is equivalent to the image pattern 1, the pattern is shown again as another image pattern so as to explain an embodiment for evaluating the output accuracy for proportional expansion and the output accuracy for proportional contraction in black-and-white printing. Similar to the image pattern 1, the data of the coordinates of points a1 to a10, b1 to b10, and c1 to c10 (these reference symbols are omitted in FIG. 5) are stored in a computer (e.g., a personal computer) in advance. In addition, the input coordinates of points a1 to a10, b1 to b10, and c1 to c10 are defined so as to satisfy the proportional relationships:

$$a11:b11:c11=a12:b12:c12=a13:b13:c13=1:2:3,$$

and $$a14:a15:a16=b14:b15:b16=c14:c15:c16=1:10:20$$

where each reference symbol in the upper line (i.e., $a11$, $b11, \ldots, c13$) indicates the length of the longer side of each rectangle, and each reference symbol in the lower line (i.e., $a14, a15, \ldots, c16$) indicates the length of the shorter side of each rectangle (see FIG. 5). Based on the input coordinates, the image pattern 5 may be printed using a printer on different papers such as a plain paper and a heat sensitive paper.

Here, the image pattern 5 is printed on a plain paper and on a heat sensitive paper. The printed image patterns are each read using a scanner or a three-dimensional measurement device, and the read data are input into the computer. The computer then calculates, for each printed image pattern, (i) nine distances between a1-a2, a1-a3, a1-a4, a1-a5, a1-a6, a1-a7, a1-a8, a1-a9, and a1-a10, (ii) nine distances between b1-b2, b1-b3, b1-b4, b1-b5, b1-b6, b1-b7, b1-b8, b1-b9, and b1-b10, and (iii) nine distances between c1-c2, c1-c3, c1-c4, c1-c5, c1-c6, c1-c7, c1-c8, c1-c9, and c1-c10.

The computer defines correspondence between (i) the above calculated distances (i.e., 9×3 distances) for each printed paper and (ii) the distances between a1-a2, . . . , a1-a10, b1-b2, . . . , b1-b10, c1-c2, . . . , c1-c10 which are input in advance into the computer for printing the image pattern 5. Here, the distances between the coordinates, which are input in advance into the computer, are provided as command signals, and the distances between the coordinates, which are calculated after reading the printed image pattern 5 by the computer, are provided as output signals. The accuracy for reproducibility, that is, how accurately each proportional ratio for each straight line and for the width and the length of each rectangle is reproduced in the black-and-white printing using a printer, is evaluated with reference to three kinds of distance data, where a command signal and two output signals with respect to two kinds of different printing papers are produced for each distance. That is, the S/N ratio ($\eta$) and the sensitivity (S) are measured based on the command signals and the output signals, by using a method explained below. Accordingly, it is possible to evaluate the output accuracy for proportional expansion and the output accuracy for proportional contraction in black-and-white printing using a printer.

In the image pattern 5, nine distances in each of the vertical, horizontal, and vertical/horizontal-combined direction are measured. In order to evaluate the linearity between the command signal and the output signal, three or more command signals and corresponding output signals are necessary, and a larger number of the command signals (and the corresponding output signals) are preferable so as to improve the reliability on the evaluation for the linearity. Therefore, instead of printing the lines and rectangles as shown in the image pattern 5, dots may be printed on each of the vertical, horizontal, and vertical/horizontal-combined direction, so as to measure at least three distances from the reference coordinates. In addition, the image pattern 5 is equivalent to the image pattern 1; thus, the output accuracy for proportional expansion and the output accuracy for proportional contraction in black-and-white printing can also be evaluated by using the image pattern 1.

In the above embodiment, the image pattern 5 is used for evaluating the output accuracy for proportional expansion and the output accuracy for proportional contraction in black-and-white printing using a printer. However, a scanner may be used for reading the image pattern 5 so as to input the image pattern into the computer. In this case, data of the image pattern are analyzed on the computer by the above-explained method, thereby evaluating the output accuracy for proportional expansion and the output accuracy for proportional contraction when a black-and-white print is read using the scanner into the computer. Here, it is assumed that the printing accuracy of the printing system for printing the image pattern 5 is sufficiently high.

In another pattern-reading method, digital data for the image pattern 5 are produced using a computer, and a corresponding image is projected onto a wall surface by using a projector. The projected image is read using a camera, and the read data are analyzed on the computer by using the above-explained method, thereby evaluating the output accuracy for proportional expansion and the output accuracy for proportional contraction when the projector projects a black-and-white image onto the wall surface.

In another pattern-reading method, digital data for the image pattern 5 are produced using the computer, and a corresponding image is displayed on a display of a monitor. The displayed image is read using a camera, and the read data are analyzed on the computer by using the above-explained method, thereby evaluating the output accuracy for proportional expansion and the output accuracy for proportional contraction when the monitor displays a black-and-white image.

Figure 6A:
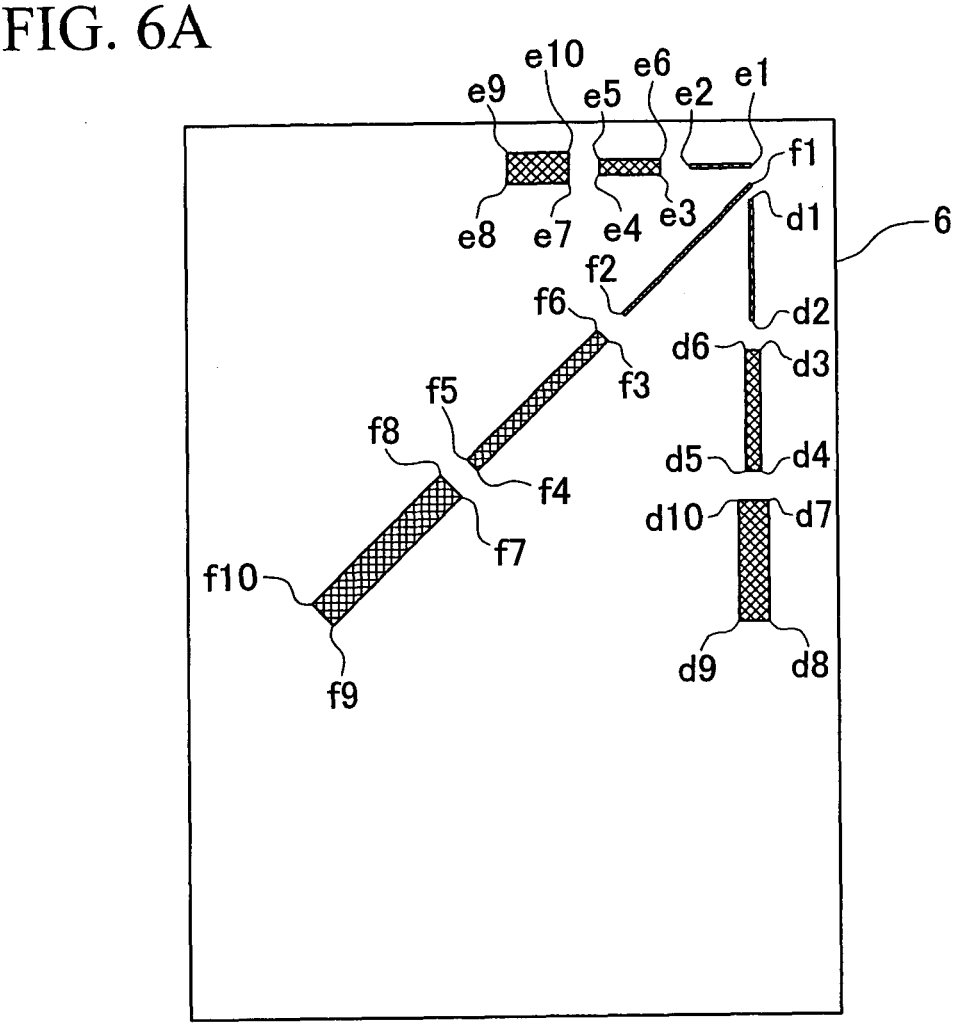
FIG. 6A is a diagram showing an image pattern for evaluating the accuracy for image printing in color printing with tristimulus values (for R (red), G (green), and B (blue) colors) of "R:G:B=128:128:128", in an embodiment according to the present invention.
Figure 6B:
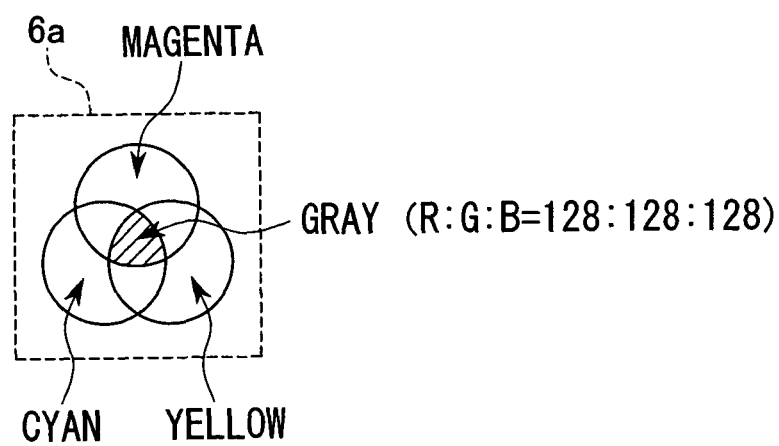
FIG. 6B shows an enlarged image of a pixel on the printed image pattern of FIG. 6A.

Below, FIGS. 6A and 6B will be explained. FIG. 6A is a diagram showing an image pattern 6 for evaluating the accuracy for image printing (i.e., how accurately the image is printed, without distortion or positional shift) in color printing with tristimulus values (for R (red), G (green), and B (blue) colors) of "R:G:B=128:128:128". In FIG. 6B, reference symbol 6a indicates an enlarged image of a pixel on the printed image pattern 6.

The image pattern 6 is obtained by turning the image pattern 1 by 180° and is color-printed with the tristimulus values of "R:G:B=128:128:128". Here, the image pattern 1 is printed using an inkhead for black-and-white printing provided in a printer, where the inkhead is composed of a black-ink tank and a nozzle for jetting the ink. In contrast, the image pattern 6 is printed using an inkhead for color printing provided in a printer, with the tristimulus values of "R:G:B=128:128:128", where the inkhead is composed of three ink tanks for three colors of C (cyan), M (magenta), and Y (yellow), and each nozzle for each ink. The accuracy for printing (i.e., how accurately the image is printed, without distortion or positional shift) may depend on the inkhead; thus, the printing accuracy in color printing should be evaluated independent of the evaluation for the printing accuracy in black-and-white printing. Here, the color produced by the tristimulus values of "R:G:B=128:128:128" is gray.

In addition, the tristimulus values of "R:G:B=128:128:128" are defined so as to evaluate the printing accuracy when the inks of C (cyan), M (magenta), and Y (yellow) (i.e., the inks used in a color-printing inkhead) are equivalently used.

When printing is performed using C, M, and Y-colored inks with the tristimulus values of "R:G:B=128:128:128", the element colors are partially overlapped as shown in FIG. 6B. The overlapped portion of C, M, and Y-colored inks has a color of gray which corresponds to the tristimulus values of "R:G:B=128:128:128". The computer uses the image pattern 6 so as to evaluate the printing accuracy at the overlapped portion of C, M, and Y-colored inks, which has the tristimulus values of "R:G:B=128:128:128".

The image pattern 6 has reference coordinates of point d1, and a straight line d1-d2 is printed, where d2 is another point whose coordinates are defined on the vertical direction from point d1. On the extension direction from the line d1-d2, two rectangles having different sizes are printed: one is formed by four points d3, d4, d5, and d6, and the other is formed by four points d7, d8, d9, and d10. The image pattern also has reference coordinates of point e1, and a straight line e1-e2 is printed, where e2 is another point whose coordinates are defined on the horizontal direction from point e1. On the extension direction from the line e1-e2, two rectangles having different sizes are printed: one is formed by four points e3, e4, e5, and e6, and the other is formed by four points e7, e8, e9, and e10. The image pattern also has reference coordinates of point f1, and a straight line f1-f2 is printed, where f2 is another point whose coordinates are defined on the direction which is inclined by 45° from both vertical and horizontal axes, that is, on the vertical/horizontal-combined direction. On the extension direction from the line f1-f2, two rectangles having different sizes are printed: one is formed by four points f3, f4, f5, and f6, and the other is formed by four points f7, f8, f9, and f10.

The coordinates of these points d1 to d10, e1 to e10, and f1 to f10 are input and stored in advance in a computer (e.g., a personal computer). Based on the input coordinates, the image pattern 6 may be color-printed using a printer on different papers such as a plain paper and a heat sensitive paper.

Here, the image pattern 6 is printed on a plain paper and on a heat sensitive paper. The printed image patterns are each read using a scanner or a three-dimensional measurement device, and the read data are input into the computer.

The computer then calculates, for each printed image pattern, (i) nine distances between d1-d2, d1-d3, d1-d4, d1-d5, d1-d6, d1-d7, d1-d8, d1-d9, and d1-d10 (i.e., distance between d1-d2, distance between d1-d3, . . . ), (ii) nine distances between e1-e2, e1-e3, e1-e4, e1-e5, e1-e6, e1-e7, e1-e8, e1-e9, and e1-e10, and (iii) nine distances between f1-f2, f1-f3, f1-f4, f1-f5, f1-f6, f1-f7, f1-f8, f1-f9, and f1-f10. Here, at each point of the above coordinates, the C, M, and Y-colored inks are overlapped and the tristimulus values are "R:G:B=128:128:128".

The computer defines correspondence between (i) the above calculated distances (i.e., 9×3 distances) for each printed paper and (ii) the distances between d1-d2, . . . , d1-d10, e1-e2, . . . , e1-e10, f1-f2, . . . , f1-f10 which are input in advance into the computer for printing the image pattern 6. Here, the distances between the coordinates, which are input in advance into the computer, are provided as command signals, and the distances between the coordinates, which are calculated after reading the printed image pattern 6 by the computer, are provided as output signals. The accuracy for image printing (i.e., how accurately the image is printed, without distortion or positional shift) in the color printing using a printer, with the tristimulus values of "R:G:B=128:128:128", is evaluated with reference to three kinds of distance data, where a command signal and two output signals with respect to two kinds of different printing papers are produced for each distance. That is, the S/N ratio ($\eta$) and the sensitivity (S) are measured based on the command signals and the output signals, by using a method explained below. Accordingly, it is possible to evaluate the accuracy for image printing (in color printing using a printer) with the tristimulus values of "R:G:B=128:128:128".

In the image pattern 6, nine distances in each of the vertical, horizontal, and vertical/horizontal-combined direction are measured. In order to evaluate the linearity between the command signal and the output signal, three or more command signals and corresponding output signals are necessary, and a larger number of the command signals (and the corresponding output signals) are preferable so as to improve the reliability on the evaluation for the linearity. Therefore, instead of printing the lines and rectangles as shown in the image pattern 6, dots may be printed on each of the vertical, horizontal, and vertical/horizontal-combined direction, so as to measure at least three distances from the reference coordinates.

In the above embodiment, the image pattern 6 is used for evaluating the accuracy for image printing (i.e., with respect to image distortion or positional shift) in color printing using a printer. However, a scanner may be used for reading the image pattern 6 so as to input the image pattern into the computer. In this case, data of the image pattern are analyzed on the computer by the above-explained method, thereby evaluating the printing accuracy with respect to image distortion or positional shift when a color print is read using the scanner into the computer. Here, it is assumed that the printing accuracy of the printing system for printing the image pattern 6 is sufficiently high.

In another pattern-reading method, digital data for the image pattern 6 are produced using a computer, and a corresponding image is projected onto a wall surface by using a projector. The projected image is read using a camera, and the read data are analyzed on the computer by using the above-explained method, thereby evaluating the projecting accuracy with respect to image distortion or positional shift when the projector projects a color image onto the wall surface.

In another pattern-reading method, digital data for the image pattern 6 are produced using the computer, and a corresponding image is displayed on a display of a monitor. The displayed image is read using a camera, and the read data are analyzed on the computer by using the above-explained method, thereby evaluating the displaying accuracy with respect to image distortion or positional shift when the monitor displays a color image.

Figure 7:
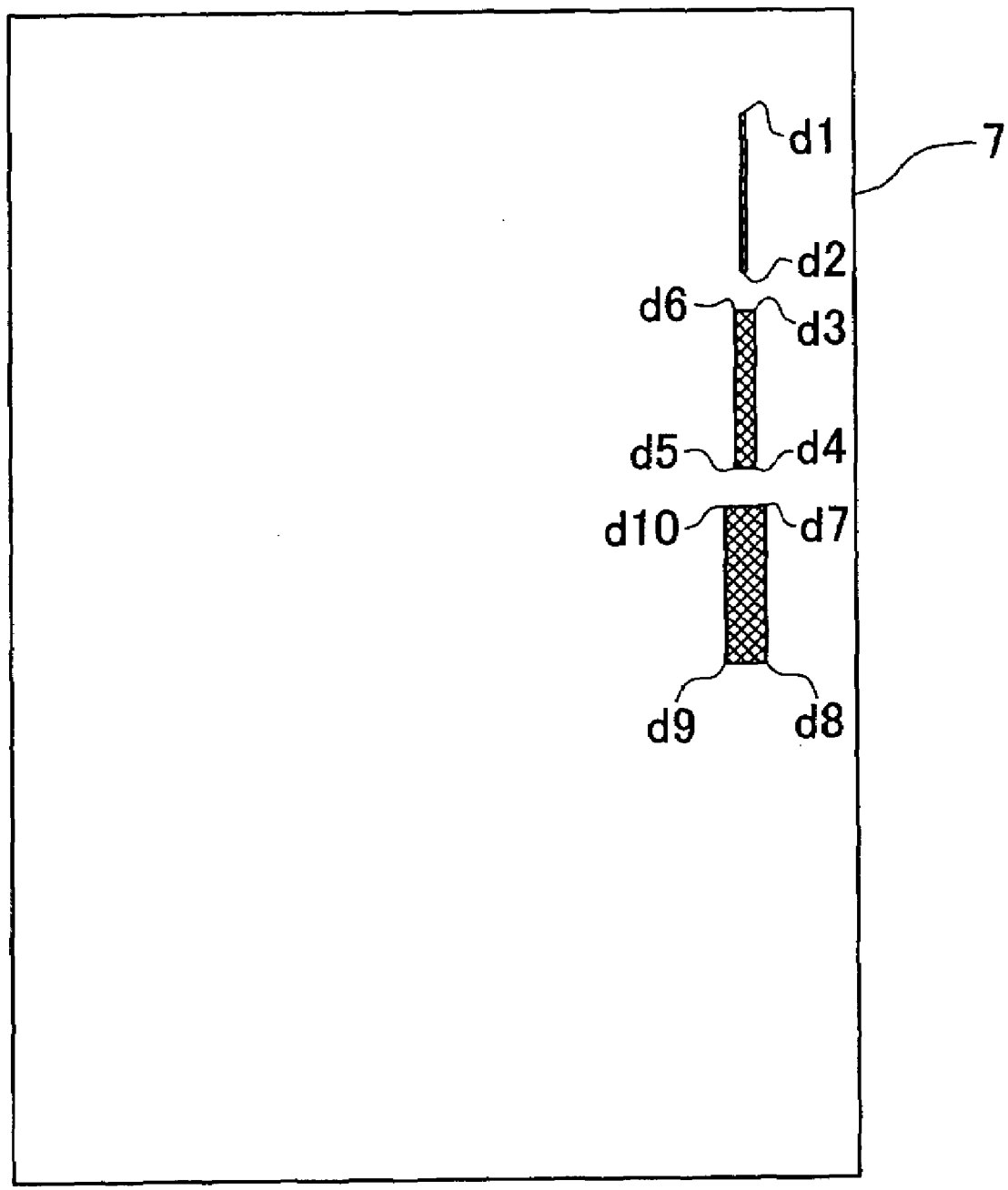
FIG. 7 is a diagram showing an image pattern used for evaluating the accuracy for constant-speed paper feeding in the feeding direction (i.e., the vertical direction) in color printing with the tristimulus values of "R:G:B=128:128:128", in an embodiment according to the present invention.

Below, FIG. 7 will be explained. FIG. 7 is a diagram showing an image pattern 7 used for evaluating the accuracy for constant-speed paper feeding in the feeding direction (i.e., the vertical direction) in color printing with the tristimulus values of "R:G:B=128:128:128". This image pattern 7 is equivalent to a pattern in the paper feeding direction (i.e., the vertical direction) in FIG. 6, which includes a straight line and two rectangles; that is, the image pattern 7 has reference coordinates of point d1, and a straight line d1-d2 is printed, where d2 is another point whose coordinates are defined on the vertical direction from point d1. On the extension direction from the line d1-d2, two rectangles having different sizes are printed: one is formed by four points d3, d4, d5, and d6, and the other is formed by four points d7, d8, d9, and d10.

The coordinates of these points d1 to d10 are input and stored in advance in a computer (e.g., a personal computer). Based on the input coordinates, the image pattern 7 may be color-printed with the tristimulus values of "R:G:B=128:128:128" using a printer on different papers such as a plain paper and a heat sensitive paper.

Here, the image pattern 7 is printed on a plain paper and on a heat sensitive paper. The printed image patterns are each read using a scanner or a three-dimensional measurement device, and the read data are input into the computer. The computer then calculates, for each printed image pattern, nine distances between d1-d2, d1-d3, d1-d4, d1-d5, d1-d6, d1-d7, d1-d8, d1-d9, and d1-d10. The computer defines correspondence between the above calculated distances for each printed paper and the distances between d1-d2, . . . , d1-d10 which are input in advance into the computer for printing the image pattern 7. Here, the distances between the coordinates, which are input in advance into the computer, are provided as command signals, and the distances between the coordinates, which are calculated after reading the printed image pattern 7 by the computer, are provided as output signals. The accuracy for the speed for paper feeding in the feeding direction (i.e., the vertical direction), that is, whether the paper feeding speed is constant without drifting, in color printing with the tristimulus values of "R:G:B=128:128:128", is evaluated with reference to three kinds of distance data, where a command signal and two output signals with respect to two kinds of different printing papers are produced for each distance.

In order to calculate each distance between the coordinates by using the image pattern 7 which is read and input into the computer, the coordinates are determined at each point where C, M, and Y-colored inks are overlapped and thus the condition of "R:G:B=128:128:128" is satisfied, similar to the above-explained evaluation for printing accuracy by using the image pattern 6.

That is, the S/N ratio ($\eta$) and the sensitivity (S) are measured based on the command signals and the output signals, by using a method explained below. Accordingly, it is possible to evaluate the accuracy for the speed in the paper feeding direction (i.e., the vertical direction) in color printing with the tristimulus values of "R:G:B=128:128:128".

In the image pattern 7, nine distances in the vertical direction are measured. In order to evaluate the linearity between the command signal and the output signal, three or more command signals and corresponding output signals are necessary, and a larger number of the command signals (and the corresponding output signals) are preferable so as to improve the reliability on the evaluation for the linearity. Therefore, instead of printing the line and rectangles as shown in the image pattern 7, dots may be printed in the vertical direction, so as to measure at least three distances from the reference coordinates. In addition, the image pattern 7 is equivalent to the image pattern including a straight line and two rectangles in the vertical direction in the image pattern 6; thus, the accuracy for the speed in the paper feeding direction (i.e., the vertical direction) in color printing with the tristimulus values of "R:G:B=128:128:128" can also be evaluated by using the image pattern 6.

In the above, an example for evaluating whether the paper feeding speed is constant in color printing using a printer by employing the image pattern 7 has been explained. However, distortion of a belt for moving a lens in a scanner, or distortion of the lens itself may be evaluated with respect to the above-explained paper feeding direction (i.e., the vertical direction). That is, when the image pattern 7 is read via a scanner by the computer and data of the image pattern are analyzed on the computer by the above-explained method, it is possible to evaluate the distortion of the belt for moving the lens in the scanner or the distortion of the lens itself, where the distortion is produced when a color print is read by a computer via the scanner. Here, it is assumed that the printing accuracy of the printing system for printing the image pattern 7 is sufficiently high.

In addition, distortion of a lens in a projector, or combined lamps in the projector, may be evaluated with respect to the above-explained paper feeding direction (i.e., the vertical direction). That is, digital data for the image pattern 7 are produced using a computer, and a corresponding image is projected onto a wall surface by using a projector. The projected image is read using a camera, and the read data are analyzed on the computer by using the above-explained method, thereby evaluating the distortion of the lens or the combination of lamps when a color image is projected onto the wall surface by using the projector.

In addition, distortion of an output image from a monitor or the combination of luminous colors on a display of the monitor may be evaluated with respect to the above-explained paper feeding direction (i.e., the vertical direction). That is, digital data for the image pattern 7 are produced using the computer, and a corresponding image is displayed on a display of a monitor. The displayed image is read using a camera, and the read data are analyzed on the computer by using the above-explained method, thereby evaluating the distortion of an output image from the monitor or the combination of luminous colors on the display of the monitor when the monitor displays a color image.

Figure 8:
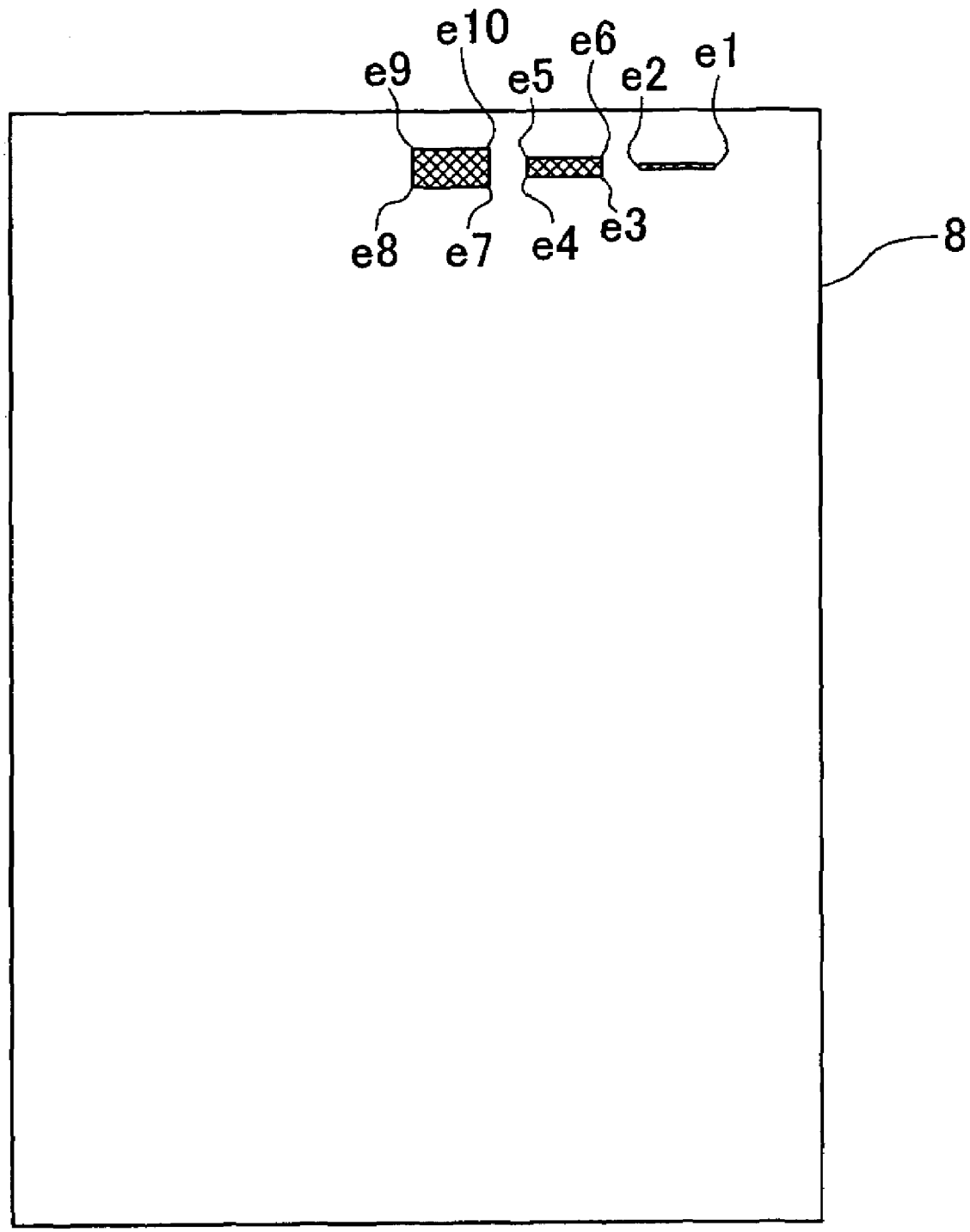
FIG. 8 is a diagram showing an image pattern used for evaluating the accuracy for inkhead motion in a direction in which the inkhead moves (i.e., the horizontal direction) in color printing with the tristimulus values of "R:G:B=128:128:128", in an embodiment according to the present invention.

Below, FIG. 8 will be explained. FIG. 8 is a diagram showing an image pattern 8 used for evaluating the accuracy for inkhead motion in a direction in which the inkhead moves (here, the horizontal direction) in color printing with the tristimulus values of "R:G:B=128:128:128". This image pattern 8 is equivalent to a pattern in the horizontal direction in FIG. 6, which includes a straight line and two rectangles; that is, the image pattern 8 has reference coordinates of point e1, and a straight line e1-e2 is printed, where e2 is another point whose coordinates are defined on the horizontal direction from point e1. On the extension direction from the line e1-e2, two rectangles having different sizes are printed: one is formed by four points e3, e4, e5, and e6, and the other is formed by four points e7, e8, e9, and e10.

The coordinates of these points e1 to e10 are input and stored in advance in a computer (e.g., a personal computer). Based on the input coordinates, the image pattern shown 8 may be color-printed with the tristimulus values of "R:G:B=128:128:128" using a printer on different papers such as a plain paper and a heat sensitive paper.

Here, the image pattern 8 is printed on a plain paper and on a heat sensitive paper. The printed image patterns are each read using a scanner or a three-dimensional measurement device, and the read data are input into the computer. The computer then calculates, for each printed image pattern, nine distances between e1-e2, e1-e3, e1-e4, e1-e5, e1-e6, e1-e7, e1-e8, e1-e9, and e1-e10. The computer defines correspondence between the above calculated distances for each printed paper and the distances between e1-e2, . . . , e1-e10 which are input in advance into the computer for printing the image pattern 8. Here, the distances between the coordinates, which are input in advance into the computer, are provided as command signals, and the distances between the coordinates, which are calculated after reading the printed image pattern 8 by the computer, are provided as output signals. The accuracy for the inkhead motion in the color printing with the tristimulus values of "R:G:B=128:128:128", that is, whether the inkhead motion is accurately performed based on the coordinates which are input into the computer in advance, is evaluated with reference to three kinds of distance data, where a command signal and two output signals with respect to two kinds of different printing papers are produced for each distance.

In order to calculate by the computer each distance between the coordinates by using the image pattern 8 which is read and input into the computer, the coordinates are determined at each point where C, M, and Y-colored inks are overlapped and thus the condition of "R:G:B=128:128:128" is satisfied, similar to the above-explained evaluation for printing accuracy by using the image pattern 6. The S/N ratio (η) and the sensitivity (S) are then measured based on the command signals and the output signals, by using a method explained below. Accordingly, it is possible to evaluate the accuracy for the inkhead motion in the inkhead moving direction (i.e., in the horizontal direction) in color printing with the tristimulus values of "R:G:B=128:128:128".

In the image pattern 8, nine distances in the horizontal direction are measured. In order to evaluate the linearity between the command signal and the output signal, three or more command signals and corresponding output signals are necessary, and a larger number of the command signals (and the corresponding output signals) are preferable so as to improve the reliability of the evaluation for the linearity. Therefore, instead of printing the line and rectangles as shown in the image pattern 8, dots may be printed in the horizontal direction, so as to measure at least three distances from the reference coordinates. In addition, the image pattern 8 is equivalent to the image pattern including a straight line and two rectangles in the horizontal direction in the image pattern 6; thus, the accuracy for the inkhead motion in the inkhead moving direction (i.e., the horizontal direction) can also be evaluated by using the image pattern 6.

In the above, an example for evaluating the inkhead motion in the inkhead moving direction (i.e., the horizontal direction) by using the image pattern 8, in color printing using a printer, has been explained. However, distortion of a belt for moving a lens in a scanner, or distortion of the lens itself may be evaluated with respect to the above-explained inkhead moving direction (i.e., the horizontal direction). That is, when the image pattern 8 is read via a scanner by the computer and data of the image pattern are analyzed on the computer by the above-explained method, it is possible to evaluate the distortion of the belt for moving the lens in the scanner or the distortion of the lens itself, where the distortion is produced when a color print is read by a computer via the scanner. Here, it is assumed that the printing accuracy of the printing system for printing the image pattern 8 is sufficiently high.

In addition, distortion of a lens in a projector, or combined lamps in the projector, may be evaluated with respect to the above-explained inkhead moving direction (i.e., the horizontal direction). That is, digital data for the image pattern 8 are produced using a computer, and a corresponding image is projected onto a wall surface by using a projector. The projected image is read using a camera, and the read data are analyzed on the computer by using the above-explained method, thereby evaluating the distortion of the lens or the combination of lamps when a color image is projected onto the wall surface by using the projector.

In addition, distortion of an output image from a monitor or the combination of luminous colors on a display of the monitor may be evaluated with respect to the above-explained inkhead moving direction (i.e., the horizontal direction). That is, digital data for the image pattern 8 are produced using the computer, and a corresponding image is displayed on a display of a monitor. The displayed image is read using a camera, and the read data are analyzed on the computer by using the above-explained method, thereby evaluating the distortion of an output image from the monitor or the combination of luminous colors on the display of the monitor when the monitor displays a color image.

Figure 9:
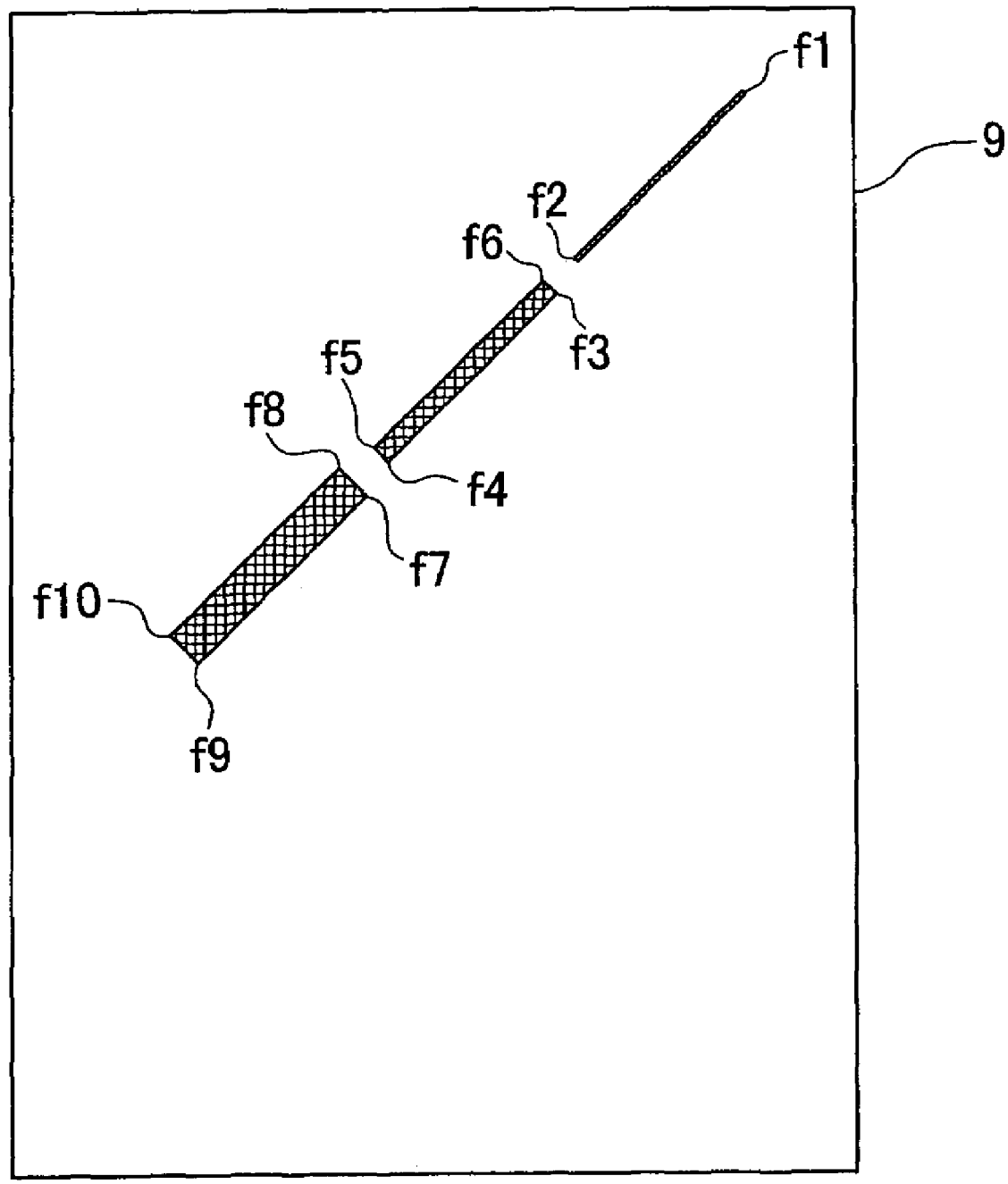
FIG. 9 is a diagram showing an image pattern used for synthetically evaluating the accuracy for paper feeding in the paper feeding direction (i.e., the vertical direction) and the accuracy for inkhead motion in the inkhead moving direction (i.e., the horizontal direction), in color printing with the tristimulus values of "R:G:B=128:128:128", in an embodiment according to the present invention.

Below, FIG. 9 will be explained. FIG. 9 is a diagram showing an image pattern 9 used for synthetically evaluating the accuracy for paper feeding in the paper feeding direction (i.e., the vertical direction) and the accuracy for inkhead motion in the inkhead moving direction (i.e., the horizontal direction), that is, a synthetic accuracy in color printing with the tristimulus values of "R:G:B=128:128:128". This image pattern 9 is equivalent to a pattern in the vertical/horizontal-combined direction in FIG. 6, which includes a straight line and two rectangles; that is, the image pattern 9 has reference coordinates of point f1, and a straight line f1-f2 is printed, where f2 is another point whose coordinates are defined on the vertical/horizontal-combined direction (which is inclined by 45° from both vertical and horizontal directions) from point f1. On the extension direction from the line f1-f2, two rectangles having different sizes are printed: one is formed by four points f3, f4, f5, and f6, and the other is formed by four points f7, f8, f9, and f10.

The coordinates of these points f1 to f10 are input and stored in advance in a computer (e.g., a personal computer). Based on the input coordinates, the image pattern 9 may be color-printed with the tristimulus values of "R:G:B=128:128:128" using a printer on different papers such as a plain paper and a heat sensitive paper.

Here, the image pattern 9 is printed on a plain paper and on a heat sensitive paper. The printed image patterns are each read using a scanner or a three-dimensional measurement device, and the read data are input into the computer. The computer then calculates, for each printed image pattern, nine distances between f1-f2, f1-f3, f1-f4, f1-f5, f1-f6, f1-f7, f1-f8, f1-f9, and f1-f10. The computer defines correspondence between the above calculated distances for each printed paper and the distances between f1-f2, . . . , f1-f10 which are input in advance into the computer for printing the image pattern 9. Here, the distances between the coordinates, which are input in advance into the computer, are provided as command signals, and the distances between the coordinates, which are calculated after reading the printed image pattern 9 by the computer, are provided as output signals. Then, the accuracies in the color printing with the tristimulus values of "R:G:B=128:128:128", that is, (i) the accuracy whether the paper is fed at a constant speed and (ii) the accuracy whether the inkhead motion is accurately performed based on the coordinates which are input in advance into the computer, are synthetically evaluated with reference to three kinds of distance data, where a command signal and two output signals with respect to two kinds of different printing papers are produced for each distance.

In order to calculate by the computer each distance between the coordinates by using the image pattern 9 which is read and input into the computer, the coordinates are determined at each point where C, M, and Y-colored inks are overlapped and thus the condition of "R:G:B=128:128:128" is satisfied, similar to the above-explained evaluation for printing accuracy by using the image pattern 6. The S/N ratio ($\eta$) and the sensitivity (S) are then measured based on the command signals and the output signals, by using a method explained below. Accordingly, it is possible to synthetically evaluate, for color printing with the tristimulus values of "R:G:B=128:128:128", the accuracy for paper feeding in the paper feeding direction (i.e., the vertical direction) and the accuracy for the inkhead motion in the inkhead moving direction (i.e., in the horizontal direction).

In the image pattern 9, nine distances in the vertical/horizontal-combined direction are measured. In order to evaluate the linearity between the command signal and the output signal, three or more command signals and corresponding output signals are necessary, and a larger number of the command signals (and the corresponding output signals) are preferable so as to improve the reliability on the evaluation for the linearity. Therefore, instead of printing the line and rectangles as shown in the image pattern 9, dots may be printed in the vertical/horizontal-combined direction, so as to measure at least three distances from the reference coordinates of point f1. In addition, the image pattern 9 is equivalent to the image pattern including a straight line and two rectangles in the vertical/horizontal-combined direction in the image pattern 6; thus, the synthetic accuracy for the paper feeding in the paper feeding direction (i.e., the vertical direction) and for the inkhead motion in the inkhead moving direction (i.e., the horizontal direction) in the color printing with the tristimulus values of "R:G:B=128:128:128" can also be evaluated by using the image pattern 6.

In the above, an example for synthetically evaluating the paper feeding in the paper feeding direction (i.e., the vertical direction) and the inkhead motion in the inkhead moving direction (i.e., the horizontal direction) by using the image pattern 9 in color printing using a printer has been explained. However, each of the above-explained paper feeding direction (i.e., the vertical direction) and the inkhead moving direction (i.e., the horizontal direction) may be used for evaluating with respect to the relevant direction, distortion of a belt for moving a lens in a scanner or distortion of the lens itself. That is, when the image pattern 9 is read via a scanner by the computer and data of the image pattern are analyzed on the computer by the above-explained method, it is possible to evaluate the distortion of the belt for moving the lens in the scanner or the distortion of the lens itself, where the distortion is produced when a color print is read by a computer via the scanner. Here, it is assumed that the printing accuracy of the printing system for printing the image pattern 9 is sufficiently high.

In addition, each of the above-explained paper feeding direction (i.e., the vertical direction) and the inkhead moving direction (i.e., the horizontal direction) may be used for evaluating with respect to the relevant direction, distortion of a lens in a projector, or combined lamps in the projector. That is, digital data for the image pattern 9 are produced using a computer, and a corresponding image is projected onto a wall surface by using a projector. The projected image is read using a camera, and the read data are analyzed on the computer by using the above-explained method, thereby evaluating the distortion of the lens or the combination of lamps when a color image is projected onto the wall surface by using the projector.

In addition, each of the above-explained paper feeding direction (i.e., the vertical direction) and the inkhead moving direction (i.e., the horizontal direction) may be used for evaluating distortion of an output image from a monitor or the combination of luminous colors on a display of the monitor with respect to the relevant direction. That is, digital data for the image pattern 9 are produced using the computer, and a corresponding image is displayed on a display of a monitor. The displayed image is read using a camera, and the read data are analyzed on the computer by using the above-explained method, thereby evaluating the distortion of an output image from the monitor or the combination of luminous colors on the display of the monitor when the monitor displays a color image.

Figure 10:
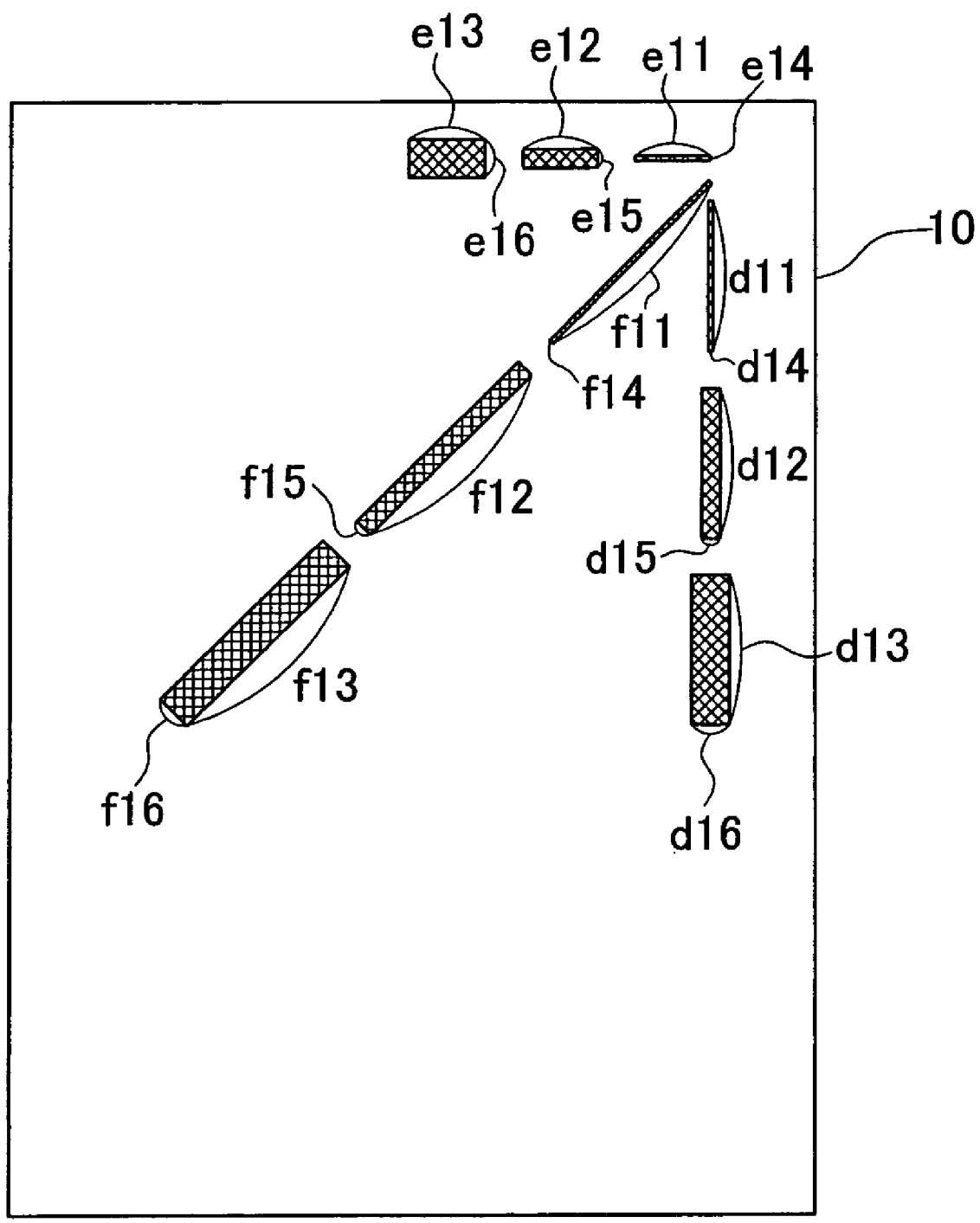
FIG. 10 is a diagram showing an image pattern for evaluating output accuracy for proportional expansion and output accuracy for proportional contraction in color printing with the tristimulus values of "R:G:B=128:128:128", in an embodiment according to the present invention.

Below, FIG. 10 will be explained. FIG. 10 is a diagram showing an image pattern 10 for evaluating output accuracy for proportional expansion and output accuracy for proportional contraction in color printing with the tristimulus values of "R:G:B=128:128:128". Although the image pattern 10 is equivalent to the image pattern 6, the pattern is shown again as another image pattern so as to explain an embodiment for evaluating the output accuracy for proportional expansion and the output accuracy for proportional contraction in color printing with the tristimulus values of "R:G:B=128:128:128". Similar to the image pattern 6, the data of the coordinates of points d1 to d0, e1 to e10, and f1 to f10 (these reference symbols are omitted in FIG. 10) are stored in a computer (e.g., a personal computer) in advance. In addition, the input coordinates of points d1 to d0, e1 to e10, and f1 to f10 are defined so as to satisfy the proportional relationships:

$$d11:e11:f11=d12:e12:f12=d13:e13:f13=2:1:3,$$

and $$d14:d15:d16=e14:e15:e16=f14:f15:f16=1:10:20$$

where each reference symbol in the upper line (i.e., d11, e11, . . . , f13) indicates the length of the longer side of each rectangle, and each reference symbol in the lower line (i.e., d14, d15, . . . , f16) indicates the length of the shorter side of each rectangle (see FIG. 10). Based on the input coordinates, the image pattern 10 may be printed using a printer on different papers such as a plain paper and a heat sensitive paper.

Here, the image pattern 10 is printed on a plain paper and on a heat sensitive paper. The printed image patterns are each read using a scanner or a three-dimensional measurement device, and the read data are input into the computer. The computer then calculates, for each printed image pattern, (i) nine distances between d1-d2, . . . , d1-d10 with respect to the reference coordinates of point d1, (ii) nine distances between e1-e2, . . . , e1-e10 with respect to the reference coordinates of point e1, and (iii) nine distances between f1-f2, . . . , f1-f10 with respect to the reference coordinates of point f1.

The computer defines correspondence between (i) the above calculated distances (i.e., 9×3 distances) for each printed paper and (ii) the distances between a1-a2, ..., a1-a10, b1-b2, ..., b1-b10, c1-c2, ..., c1-c10 which are input in advance into the computer for printing the image pattern 10. Here, the distances between the coordinates, which are input in advance into the computer, are provided as command signals, and the distances between the coordinates, which are calculated after reading the printed image pattern 10 by the computer, are provided as output signals. The accuracy for reproducibility, that is, how accurately each proportional ratio for each straight line and for the width and the length of each rectangle is reproduced in the color printing (with the tristimulus values of "R:G:B=128:128:128") using a printer, is evaluated with reference to three kinds of distance data, where a command signal and two output signals with respect to two kinds of different printing papers are produced for each distance.

In order to calculate each distance between the coordinates by using the image pattern 10 which is read and input into the computer, the coordinates are determined at each point where C, M, and Y-colored inks are overlapped and thus the condition of "R:G:B=128:128:128" is satisfied, similar to the above-explained evaluation for printing accuracy by using the image pattern 6. The S/N ratio ($\eta$) and the sensitivity (S) are then measured based on the command signals and the output signals, by using a method explained below. Accordingly, it is possible to evaluate the output accuracy for proportional expansion and the output accuracy for proportional contraction in color printing with the tristimulus values of "R:G:B=128:128:128".

In the image pattern 10, nine distances in each of the vertical, horizontal, and vertical/horizontal-combined direction are measured. In order to evaluate the linearity between the command signal and the output signal, three or more command signals and corresponding output signals are necessary, and a larger number of the command signals (and the corresponding output signals) are preferable so as to improve the reliability on the evaluation for the linearity. Therefore, instead of printing the lines and rectangles as shown in the image pattern 10, dots may be printed on each of the vertical, horizontal, and vertical/horizontal-combined direction, so as to measure at least three distances from the reference coordinates. In addition, the image pattern 10 is equivalent to the image pattern 6, that is, in both image patterns, d11:e11:f11=d12:e12:f12=d13:e13:f13=2:1:3, and d14:d15:d16=e14:e15:e16=f14:f15:f16=1:10:20. Therefore, the output accuracy for proportional expansion and the output accuracy for proportional contraction in color printing with the tristimulus values of "R:G:B=128:128:128" can also be evaluated by using the image pattern 6.

In the above embodiment, the image pattern 10 is used for evaluating the output accuracy for proportional expansion and the output accuracy for proportional contraction in color printing using a printer. However, a scanner may be used for reading the image pattern 10 so as to input the image pattern into the computer. In this case, data of the image pattern are analyzed on the computer by the above-explained method, thereby evaluating the output accuracy for proportional expansion and the output accuracy for proportional contraction when a print is read using the scanner into the computer. Here, it is assumed that the printing accuracy of the printing system for printing the image pattern 10 is sufficiently high.

In another pattern-reading method, digital data for the image pattern 10 are produced using a computer, and a corresponding image is projected onto a wall surface by using a projector. The projected image is read using a camera, and the read data are analyzed on the computer by using the above-explained method, thereby evaluating the output accuracy for proportional expansion and the output accuracy for proportional contraction when the projector projects an image onto the wall surface.

In another pattern-reading method, digital data for the image pattern 10 are produced using the computer, and a corresponding image is displayed on a display of a monitor. The displayed image is read using a camera, and the read data are analyzed on the computer by using the above-explained method, thereby evaluating the output accuracy for proportional expansion and the output accuracy for proportional contraction when the monitor displays an image.

Figure 11:
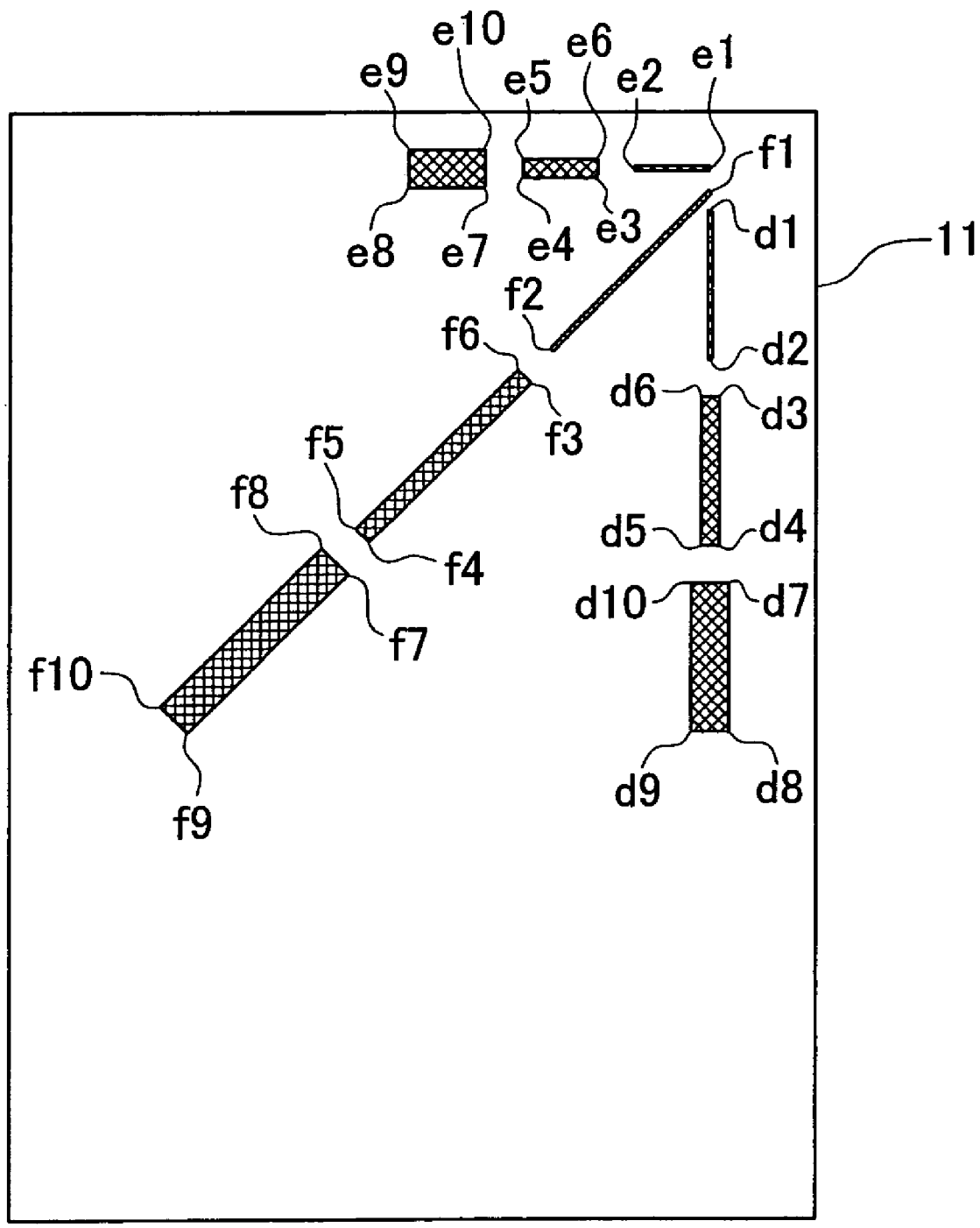
FIG. 11 is a diagram showing an image pattern used for design evaluation for each nozzle for jetting each of cyan, magenta, and yellow-colored inks in color printing with the tristimulus values of "R:G:B=128:128:128", in an embodiment according to the present invention.

Below, FIG. 11 will be explained. FIG. 11 is a diagram showing an image pattern 11 used for design evaluation for each nozzle for jetting each of cyan, magenta, and yellow-colored inks in color printing with the tristimulus values of "R:G:B=128:128:128". This image pattern 11 is the same pattern as the image pattern 6; thus, design evaluation for each nozzle can also be performed using the image pattern 6 without separately printing the image pattern 11.

In the image pattern 6, the accuracy for printing is evaluated at each overlapped portion of C (cyan), M (magenta), and Y (yellow)-colored inks, which has the tristimulus values of "R:G:B=128:128:128". However, in the image pattern 11, the accuracy of printing (i.e., how accurately the image is printed, without distortion or positional shift) is evaluated at each portion where each of the C, M, and Y is independent without being overlapped with another color, thereby performing design evaluation for each nozzle for each color.

Similar to FIG. 6, the image pattern 11 has reference coordinates of point d1, and a straight line d1-d2 is printed, where d2 is another point whose coordinates are defined on the vertical direction from point d1. On the extension direction from the line d1-d2, two rectangles having different sizes are printed: one is formed by four points d3, d4, d5, and d6, and the other is formed by four points d7, d8, d9, and d10. The image pattern also has reference coordinates of point e1, and a straight line e1-e2 is printed, where e2 is another point whose coordinates are defined on the horizontal direction from point e1. On the extension direction from the line e1-e2, two rectangles having different sizes are printed: one is formed by four points e3, e4, e5, and e6, and the other is formed by four points e7, e8, e9, and e10. The image pattern also has reference coordinates of point f1, and a straight line f1-f2 is printed, where f2 is another point whose coordinates are defined on the direction which is inclined by 45° from both vertical and horizontal axes, that is, on the vertical/horizontal-combined direction. On the extension direction from the line f1-f2, two rectangles having different sizes are printed: one is formed by four points f3, f4, f5, and f6, and the other is formed by four points f7, f8, f9, and f10.

The coordinates of these points d1 to d10, e1 to e10, and f1 to f10 are input and stored in advance in a computer (e.g., a personal computer). Based on the input coordinates, the image pattern 11 may be color-printed using a printer on different papers such as a plain paper and a heat sensitive paper.

Here, the image pattern 11 is printed on a plain paper and on a heat sensitive paper. The printed image patterns are each read using a scanner or a three-dimensional measurement device, and the read data are input into the computer. The computer then calculates, for each printed image pattern, (i) nine distances between d1-d2, ..., d1-d10 with respect to the reference coordinates of point d1, (ii) nine distances between e1-e2, . . . , e1-e10 with respect to the reference coordinates of point e1, and (iii) nine distances between f1 -f2, . . . , f1-f10 with respect to the reference coordinates of point f1. The computer defines correspondence between (i) the above calculated distances (i.e., 9×3 distances) for each printed paper and (ii) the distances between d1-d2, . . . , d1-d10, e1-e2, . . . , e1-e10, f1-f2, . . . , f1-f10 which are input in advance into the computer for printing the image pattern 11. Here, the distances between the coordinates, which are input in advance into the computer, are provided as command signals, and the distances between the coordinates, which are calculated for each of the colors of C (cyan), M (magenta), and Y (yellow) after reading the printed image pattern 11 by the computer, are provided as output signals. The design evaluation for each nozzle for jetting each of the C, M, and Y-colored inks in the color printing with the tristimulus values of "R:G:B=128:128:128" is performed with reference to three kinds of distance data, where a command signal and two output signals with respect to two kinds of different printing papers are produced for each distance.

In order to calculate each distance between the coordinates by using the image pattern 11 which is read and input into the computer, the coordinates are determined at each point where each of the C (cyan), M (magenta), and Y (yellow)-colored inks is independent without being overlapped with other colors, that is, the measurement is independently performed for each of the C, M, and Y colors.

The S/N ratio ($\eta$) and the sensitivity (S) are measured for each of the C, M, and Y colors, based on the command signals and the output signals by using a method explained below. Accordingly, it is possible to evaluate the design for each nozzle for jetting each of the C (cyan), M (magenta), and Y (yellow)-colored inks in color printing with the tristimulus values of "R:G:B=128:128:128".

In the image pattern 11, nine distances in each of the vertical, horizontal, and vertical/horizontal-combined direction are measured. In order to evaluate the linearity between the command signal and the output signal, three or more command signals and corresponding output signals are necessary, and a larger number of the command signals (and the corresponding output signals) are preferable so as to improve the reliability on the evaluation for the linearity. Therefore, instead of printing the lines and rectangles as shown in the image pattern 11, dots may be printed on each of the vertical, horizontal, and vertical/horizontal-combined direction, so as to measure at least three distances from the reference coordinates.

In the above embodiment, the image pattern 11 is used for evaluating design for each nozzle for jetting each of the cyan, magenta, and yellow-colored inks in color printing using a printer. However, a scanner may be used for reading the image pattern 11 so as to input the image pattern into the computer. In this case, data of the image pattern are analyzed on the computer by the above-explained method, thereby evaluating the data reading performance with respect to the tristimulus values for the R, G, and B colors when a color print is read using the scanner into the computer. Here, it is assumed that the printing accuracy of the printing system for printing the image pattern 11 is sufficiently high.

In another pattern-reading method, digital data for the image pattern 11 are produced using a computer, and a corresponding image is projected onto a wall surface by using a projector. The projected image is read using a camera, and the read data are analyzed on the computer by using the above-explained method, thereby evaluating the output performance with respect to the tristimulus values for the R, G, and B colors when the projector projects a color image onto the wall surface.

In another pattern-reading method, digital data for the image pattern 11 are produced using the computer, and a corresponding image is displayed on a display of a monitor. The displayed image is read using a camera, and the read data are analyzed on the computer by using the above-explained method, thereby evaluating the display performance with respect to the tristimulus values for the R, G, and B colors when the monitor displays a color image.

Figure 12:
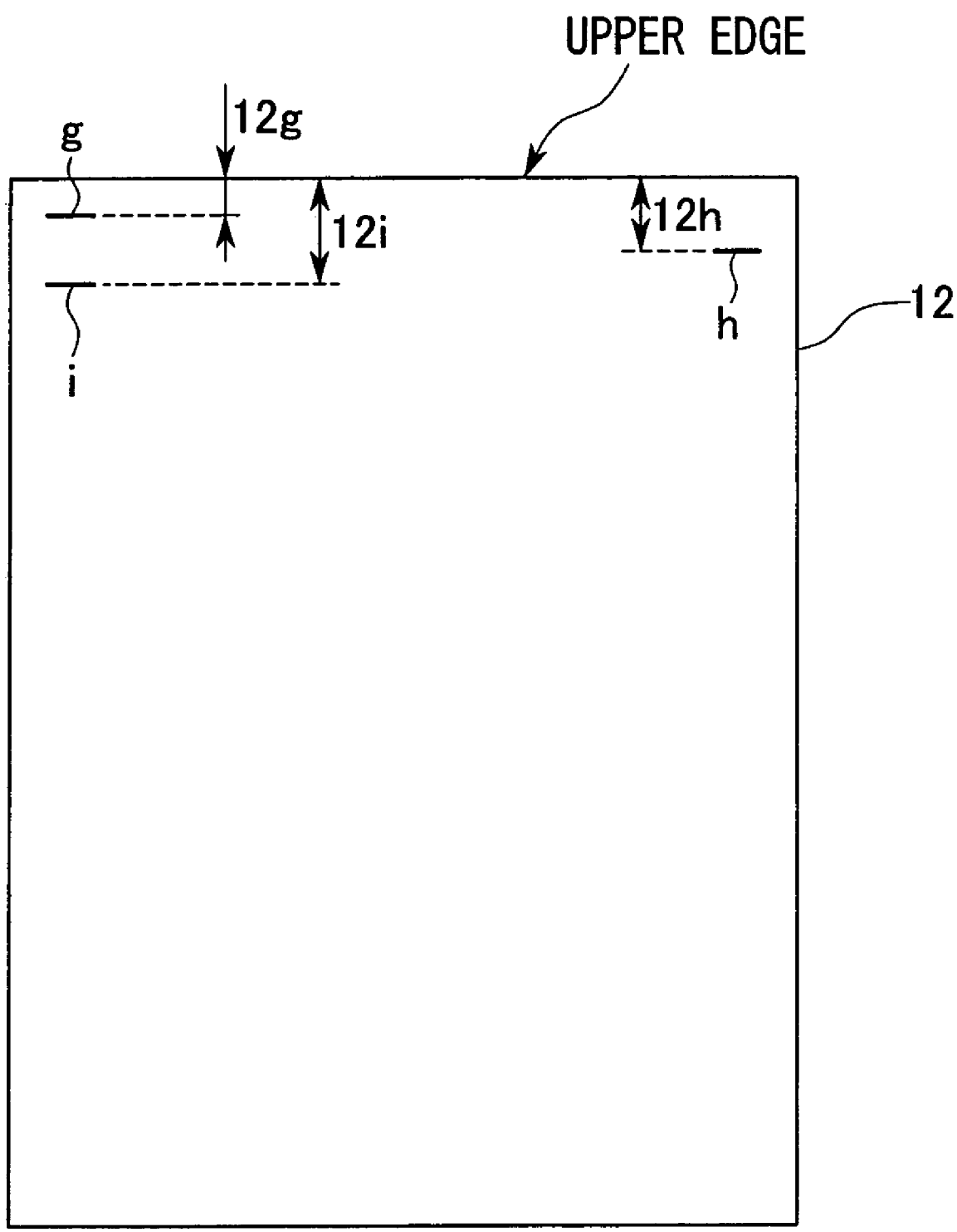
FIG. 12 is a diagram showing an image pattern used for evaluating the performance of detecting the head of a paper in a paper feeding mechanism, in an embodiment according to the present invention.

Below, FIG. 12 will be explained. FIG. 12 is a diagram showing an image pattern 12 used for evaluating the performance of detecting the head of a paper in a paper feeding mechanism.

In the image pattern 12, three straight lines g, h, and i are printed, where each distance between each straight line and the upper edge of the paper (from which the paper is fed into a printer) is different. The distances 12g, 12h, and 12i measured from the upper edge are input in advance into a computer, and based on the input distances, the straight lines g, h, and i in the image pattern 12 may be printed by a printer on different papers such as a plain paper and a heat sensitive paper.

Here, the image pattern 12 is printed on a plain paper and on a heat sensitive paper. The printed image patterns are each read using a scanner or a three-dimensional measurement device, and the read data are input into the computer. The computer then measures, for each printed image pattern, the distances 12g, 12h, and 12i. Based on the above measured distances for each printed paper and the distances 12g, 12h, and 12i which are input in advance into the computer for printing the image pattern 12, the computer evaluates the performance of detecting the head of a paper in the paper feeding mechanism in the printer. Here, the distances 12g, 12h, and 12i, which are input in advance into the computer, are provided as command signals, and the distances 12g, 12h, and 12i, which are measured after reading the printed image pattern 12 by the computer, are provided as output signals. The S/N ratio ($\eta$) and the sensitivity (S) are then measured based on the command signals and the output signals, by using a method explained below. Accordingly, it is possible to evaluate the performance of detecting the head of a paper in the paper feeding mechanism in the printer.

In the image pattern 12, three distances 12g, 12h, and 12i are measured so as to evaluate the performance of detecting the head of a paper in the paper feeding mechanism in the printer. Here, three distances are measured so as to evaluate the linearity between the command signal and the output signal, and more than three distances may be measured so as to improve the reliability on the evaluation for the linearity.

Figure 13:
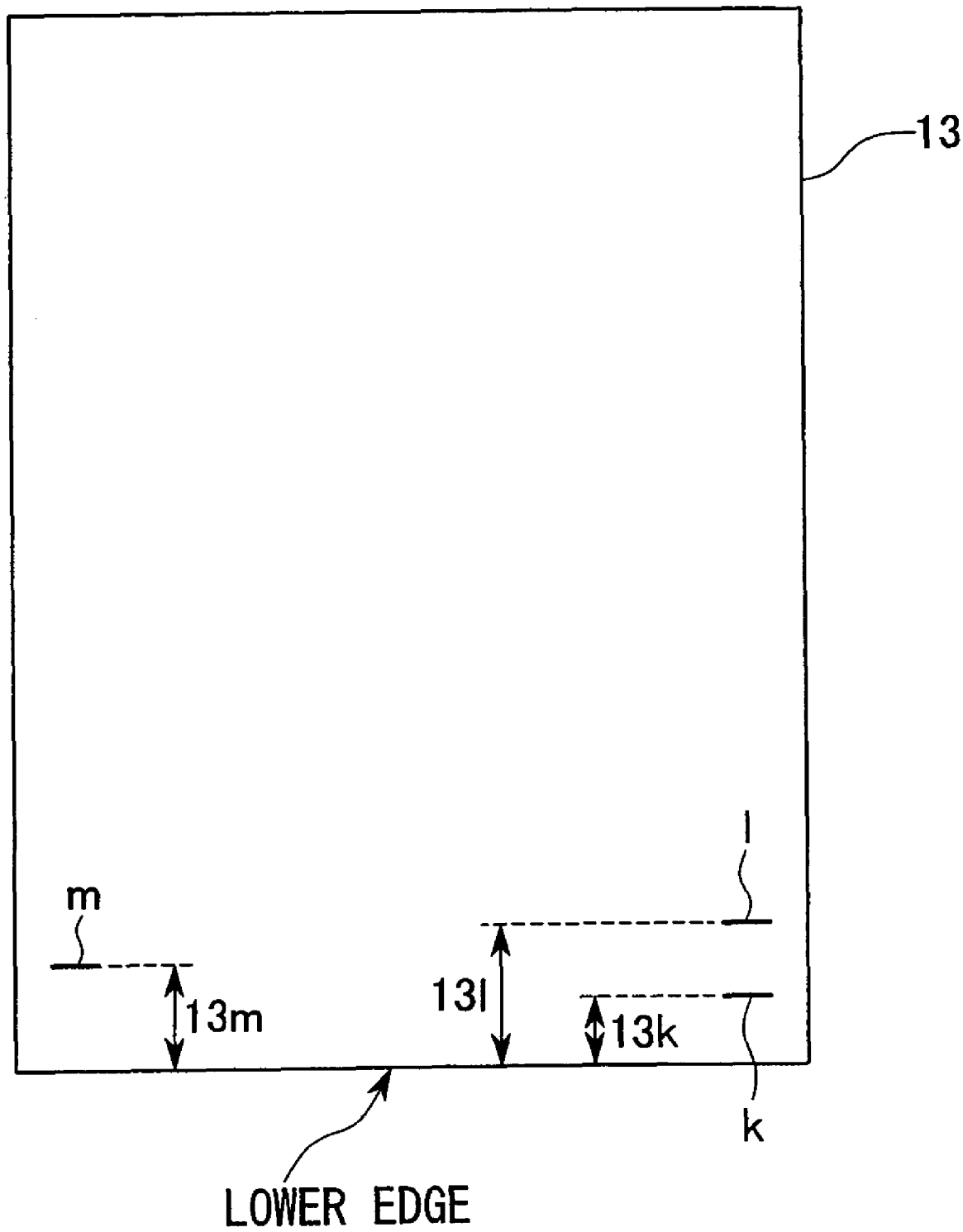
FIG. 13 is a diagram showing an image pattern used for evaluating the performance of ejecting a paper in a paper feeding mechanism, in an embodiment according to the present invention.

Below, FIG. 13 will be explained. FIG. 13 is a diagram showing an image pattern 13 used for evaluating the performance of ejecting a paper in a paper feeding mechanism.

In the image pattern 13, three straight lines k, l, and m are printed, where each distance between each straight line and the lower edge of the paper is different (the lower edge is the opposite edge to the upper edge from which the paper is fed into a printer). The distances 13k, 13l, and 13m measured from the lower edge are input in advance into a computer, and based on the input distances, the straight lines k, l, and m in the image pattern 13 may be printed by a printer on different papers such as a plain paper and a heat sensitive paper.

Here, the image pattern 13 is printed on a plain paper and on a heat sensitive paper. The printed image patterns are each read using a scanner or a three-dimensional measurement device, and the read data are input into the computer. The computer then measures, for each printed image pattern, the distances 13k, 13l, and 13m. Based on the above measured distances for each printed paper and the distances 13k, 13l, and 13m which are input in advance into the computer for printing the image pattern 13, the computer evaluates the performance of ejecting a paper in the paper feeding mechanism in the printer. Here, the distances 13k, 13l, and 13m, which are input in advance into the computer, are provided as command signals, and the distances 13k, 13l, and 13m, which are measured after reading the printed image pattern 13 by the computer, are provided as output signals. The S/N ratio ($\eta$) and the sensitivity (S) are then measured based on the command signals and the output signals, by using a method explained below. Accordingly, it is possible to evaluate the performance of ejecting a paper in the paper feeding mechanism in the printer.

In the image pattern 13, three distances 13k, 13l, and 13m are measured so as to evaluate the performance of ejecting a paper in the paper feeding mechanism in the printer. Here, three distances are measured so as to evaluate the linearity between the command signal and the output signal, and more than three distances may be measured so as to improve the reliability on the evaluation for the linearity.

Figure 14:
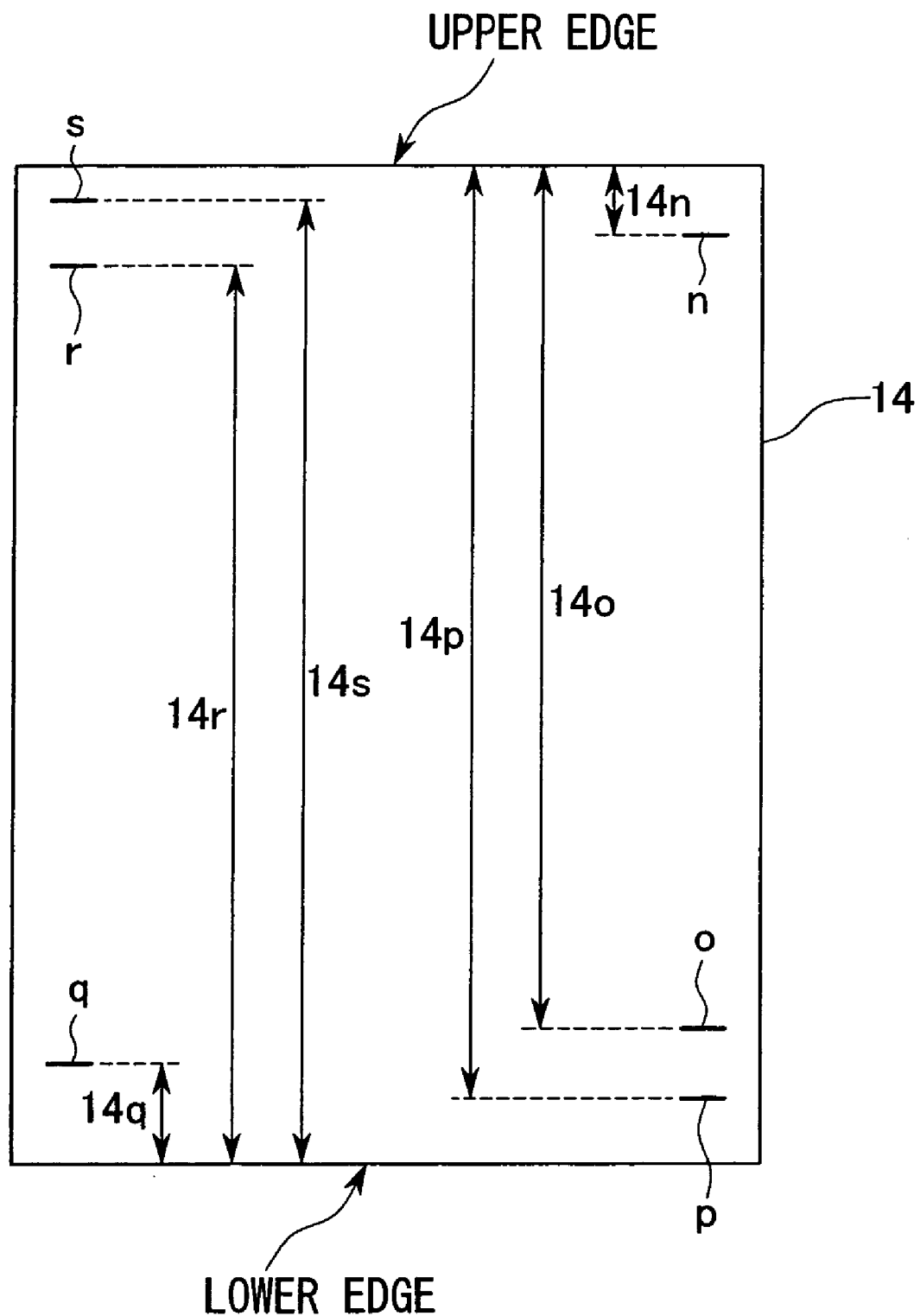
FIG. 14 is a diagram showing an image pattern used for evaluating the right/left balance in paper ejection in a paper feeding mechanism, in an embodiment according to the present invention.

Below, FIG. 14 will be explained. FIG. 14 is a diagram showing an image pattern 14 used for evaluating the right/left balance in paper ejection in a paper feeding mechanism.

In the image pattern 14, three straight lines n, o, and p are printed close to the right side of a paper, where each distance between each straight line and the upper edge of the paper (from which the paper is fed into a printer) is different. In the image pattern 14, three straight lines q, r, and s are also printed close to the left side of the paper, where each distance between each straight line and the lower edge of the paper is different (the lower edge is the opposite edge to the upper edge from which the paper is fed into the printer).

The information that the straight lines n, o, and p respectively have distances 14n, 14o, and 14p from the upper edge and that the straight lines q, r, and s respectively have distances 14q, 14r, and 14s from the lower edge is stored in advance in a computer, and based on the input distances 14n to 14s, the straight lines n, o, p, q, r, and s in the image pattern 14 may be printed by a printer on different papers such as a plain paper and a heat sensitive paper.

Here, the image pattern 14 is printed on a plain paper and on a heat sensitive paper. The printed image patterns are each read using a scanner or a three-dimensional measurement device, and the read data are input into the computer. The computer then measures, for each printed image pattern, the distances 14n, 14o, 14p, 14q, 14r, and 14s. Based on the above measured distances for each printed paper and the distances 14n, 14o, 14p, 14q, 14r, and 14s which are input in advance into the computer for printing the image pattern 14, the computer evaluates the right/left balance in paper ejection in the paper feeding mechanism in the printer. Here, the distances 14n, 14o, 14p, 14q, 14r, and 14s, which are input in advance into the computer, are provided as command signals, and the distances 14n, 14o, 14p, 14q, 14r, and 14s, which are measured after reading the printed image pattern 14 by the computer, are provided as output signals. The S/N ratio ($\eta$) and the sensitivity (S) are then measured based on the command signals and the output signals, by using a method explained below. Accordingly, it is possible to evaluate the right/left balance in paper ejection in the paper feeding mechanism in the printer.

In the image pattern 14, three distances are measured at either of the right and left sides so as to evaluate the performance of detecting the head of a paper in the paper feeding mechanism in the printer. Here, three distances at either side are measured so as to evaluate the linearity between the command signal and the output signal, and more than three distances may be measured so as to improve the reliability on the evaluation for the linearity.

Figure 15:
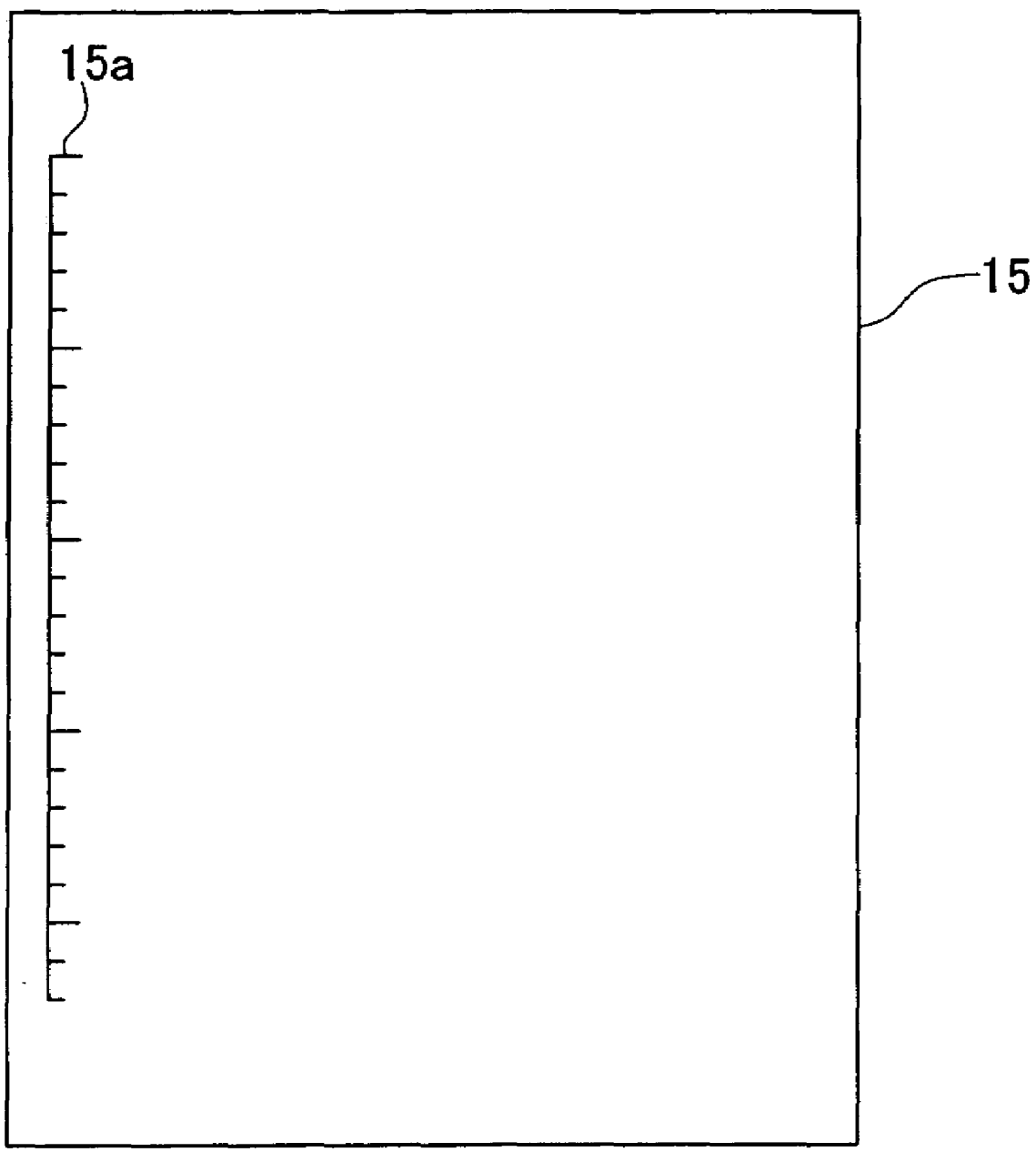
FIG. 15 is a diagram showing an image pattern used for evaluating the uniformity in paper ejection in a paper feeding mechanism, in an embodiment according to the present invention.

Below, FIG. 15 will be explained. FIG. 15 is a diagram showing an image pattern 15 used for evaluating the uniformity in paper ejection in a paper feeding mechanism.

In the image pattern 15, short lines are printed at regular intervals (see reference symbol 15a) in the paper feeding direction (i.e., the vertical direction). The interval between the short lines in the paper feeding direction is input in advance into a computer, and based on the input data, the image pattern 15 may be black-and-white-printed by a printer on different papers such as a plain paper and a heat sensitive paper.

Here, the image pattern 15 is printed on a plain paper and on a heat sensitive paper. The printed image patterns are each read using a scanner or a three-dimensional measurement device, and the read data are input into the computer. The computer then measures, for each printed image pattern, the intervals between the short lines in the paper feeding direction. Based on the above measured intervals for each printed paper and the regular interval between the short lines in the paper feeding direction which is input in advance into the computer for printing the image pattern 15, the computer evaluates the uniformity in paper ejection in the paper feeding mechanism in the printer. Here, the interval between the short lines in the paper feeding direction, which is input in advance into the computer, is provided as a command signal, and the corresponding intervals which are measured after reading the printed image pattern 15 by the computer, are provided as output signals. The S/N ratio ($\eta$) and the sensitivity (S) are then measured based on the command signal and the output signals, by using a method explained below. Accordingly, it is possible to evaluate the uniformity in paper ejection in the paper feeding mechanism in the printer.

In the image pattern 15, short lines are printed at regular intervals in the paper feeding direction. Here, three or more short lines are necessary for evaluating the uniformity in paper ejection in a paper feeding mechanism in a printer. In addition, the image pattern 15 is also used when the uniformity in paper ejection in a paper feeding mechanism in a printer is visually evaluated.

Below, the method of calculating the S/N ratio and the sensitivity for the command and output signals with respect to a printer will be explained. Here, this calculation is performed by employing a quality (control) engineering method, based on the data (such as distances between the coordinates) which are obtained by reading the image pattern (1, 2, . . . , or 15) by using a computer via a reading device such as a scanner or a three-dimensional measurement device.

In the evaluation using the image patterns 1 to 15, each image pattern is printed on different kinds of papers, that is, on a plain paper and on a heat sensitive paper. The reason for printing each image pattern on the different kinds of papers is that changes (or difference) in the output signal versus the command signal, caused by the different papers (i.e., different environmental conditions), are used in the calculation using the quality engineering method. Below, the different environmental conditions, that is, the first condition for printing on a plain paper and the second condition on a heat sensitive paper are respectively indicated by $N_1$ and $N_2$.

Next, each command signal is indicated by M while each output signal is indicated by y. When the S/N ratio and the sensitivity are calculated by employing quality engineering, a superior calculation accuracy can be obtained if the command signal M and the output signal y have a linear relationship. Therefore, at least three command signals and three output signals are necessary.

Here, three command signals $M_1$, $M_2$, and $M_3$ and different paper conditions $N_1$ and $N_2$ are considered. Therefore, regarding the command signals $M_1$, $M_2$, and $M_3$, output signals $y_{11}$, $y_{21}$, $y_{12}$, $y_{22}$, $y_{13}$, and $y_{23}$ are obtained, where the output signals $y_{11}$, $y_{12}$, and $y_{13}$ correspond to the paper condition N and the output signals $y_{21}$, $y_{22}$, and $y_{23}$ correspond to the paper condition $N_2$. Based on the command signals and the output signals, the S/N ratio and the sensitivity (i.e., with respect to the command signal and the output signal) are calculated by employing the quality engineering method.

The calculation is performed by the following steps 1 to 10.

Step 1: First, in order to grasp the general data condition, the values of all output data (i.e., all output signals) are summed after squaring each value. That is, the total variation $S_T$ is defined as follows:

$$S_T = y_{11}^2 + y_{12}^2 + y_{13}^2 + y_{21}^2 + y_{22}^2 + y_{23}^2$$

Step 2: Next, in order to determine the size of the signal, each command signal is squared and the results are summed. That is, the size $\gamma$ of the input signal is defined as follows:

$$\gamma = M_1^2 + M_2^2 + M_3^2$$

Step 3: Next, in order to determine whether the command signal and the output signal have linearity (i.e., indicated by a linear function), the values of the command signals are respectively multiplied by the corresponding values of the output signals for each error sequence (i.e., each environmental condition for the paper). That is, linear combination $L_1$ for error sequence 1 (relating environmental condition $N_1$) and linear combination $L_2$ for error sequence 2 (relating environmental condition $N_2$) are defined as follows:

$$L_1 = M_1 \times y_{11}^2 + M_2 \times y_{12}^2 + M_3 \times y_{13}^2$$

$$L_2 = M_1 \times y_{21}^2 + M_2 \times y_{22}^2 + M_3 \times y_{23}^2$$

Step 4: Next, in order to determine the variation in the coefficients of the linear combination, the results of determination for linearity (i.e., $L_1$ and $L_2$) are summed, the summed value is squared, and the result is divided by a value obtained by multiplying $\gamma$ (i.e., the sum of the squared signal values) by 2 (i.e., the number of the error sequences). That is, the variation $S_\beta$ in the linear combinations is defined as follows:

$$S_\beta = \frac{(L_1 + L_2)^2}{2 \times \gamma}$$

Step 5: Next, calculation for determining an effect by the error (here, the "error" corresponds to the kind of the paper, that is, the difference between the papers) is performed, that is, the effect $S_{N \times \beta}$ by the error is calculated. That is, the effect by the error corresponds to a difference between squared linear combination $L_1$ (which indicates the linearity of the output values with respect to condition $N_1$) and squared linear combination $L_2$ (which indicates the linearity of the output values with respect to condition $N_2$).

$$S_{N \times \beta} = \frac{(L_1^2 + L_2^2)}{2 \times \gamma}$$

Step 6: Next, in order to determine the variation caused by the error, which indicates the effect by dispersion, the variation $S_\beta$ for the linear combinations and the effect $S_{N \times \beta}$ by the error are subtracted from the sum of all data values of the output signals (i.e., $S_T$). That is, the variation $S_e$ by the error (i.e., the effect by dispersion) is defined as follows:

$$S_e = S_T - S_\beta - S_{N \times \beta}$$

Step 7: Next, in order to determine the dispersion by pooling the two kinds of effects by the error, the effect $S_{N \times \beta}$ and the variation $S_e$ by the error are summed, and the summed value is divided by "the number of errors (here, 1 (the kind of the paper))+(the number of data items (i.e., output signals)–the number of errors–the number of values which indicate the effect by the error (here, one value $S_{N \times \beta}$))". That is, the error dispersion $V_N$ obtained by pooling the effects by the error is defined as follows:

$$V_N = \frac{S_{N \times \beta} + S_e}{(1 + (6 - 1 - 1))}$$

Step 8: Next, in order to determine the error dispersion, the variation $S_e$ by the error (i.e., the effect by dispersion) is divided by a value obtained by subtracting (i) the number of kinds of the proportional terms (here, 1) and (ii) the difference between the proportional terms (here, 1), from the total number of data items. That is, the error dispersion $V_e$ is defined as follows:

$$V_e = \frac{S_e}{(6 - 1 - 1)} = \frac{S_e}{4}$$

Step 9: Next, the dispersion in the output results versus the input signals is calculated using the above calculated results. That is, the S/N ratio $\eta$ is obtained by (i) calculating the inverse number of $2 \times \gamma$ (i.e., the signal size), (ii) multiplying the inverse number (i.e., the result of calculation (i)) by a value obtained by subtracting the error dispersion $V_e$ from the variation $S_{62}$ for the linear combinations, (iii) dividing the product (i.e., the result of calculation (ii)) by the error dispersion $V_N$ (obtained by pooling the effects by the error), and (iv) multiplying the logarithm of the quotient (i.e., the result of calculation (iii)) by 10.

$$\eta = 10 \ \log\left(\frac{\frac{1}{(2 \times \gamma)} \times (S_\beta - V_e)}{V_N}\right)$$

The calculated result (i.e., the S/N ratio) indicates errors of the outputs with respect to the input signals. Therefore, if no error is produced, there is no dispersion and the S/N ratio has an infinite quantity.

Step 10: Next, calculation for determining whether the output (signal) is larger than or smaller than the input signal (i.e., command signal) is performed. That is, the sensitivity S is obtained by (i) calculating the inverse number of 2×γ (i.e., the signal size). (ii) multiplying the inverse number (i.e., the result of calculation (i)) by a value obtained by subtracting the error dispersion $V_e$ from the variation $S_β$ for the linear combinations, and (iii) multiplying the logarithm of the quotient (i.e., the result of calculation (ii)) by 10.

$$S = 10\log\left(\frac{1}{(2\times\gamma)} \times (S_\beta - V_e)\right)$$

When the output signal has a value equivalent to the command signal, the sensitivity S is 1, A value larger than 1 of sensitivity S indicates that a result having a value larger than the value of the command signal was output, while a value smaller than 1 of sensitivity S indicates that a result having a value smaller than the value of the command signal was output.

The above-explained series of calculations is performed using a computer, thereby realizing numerical evaluation based on the output values with respect to the command signals.

Figures 16A, 16B:
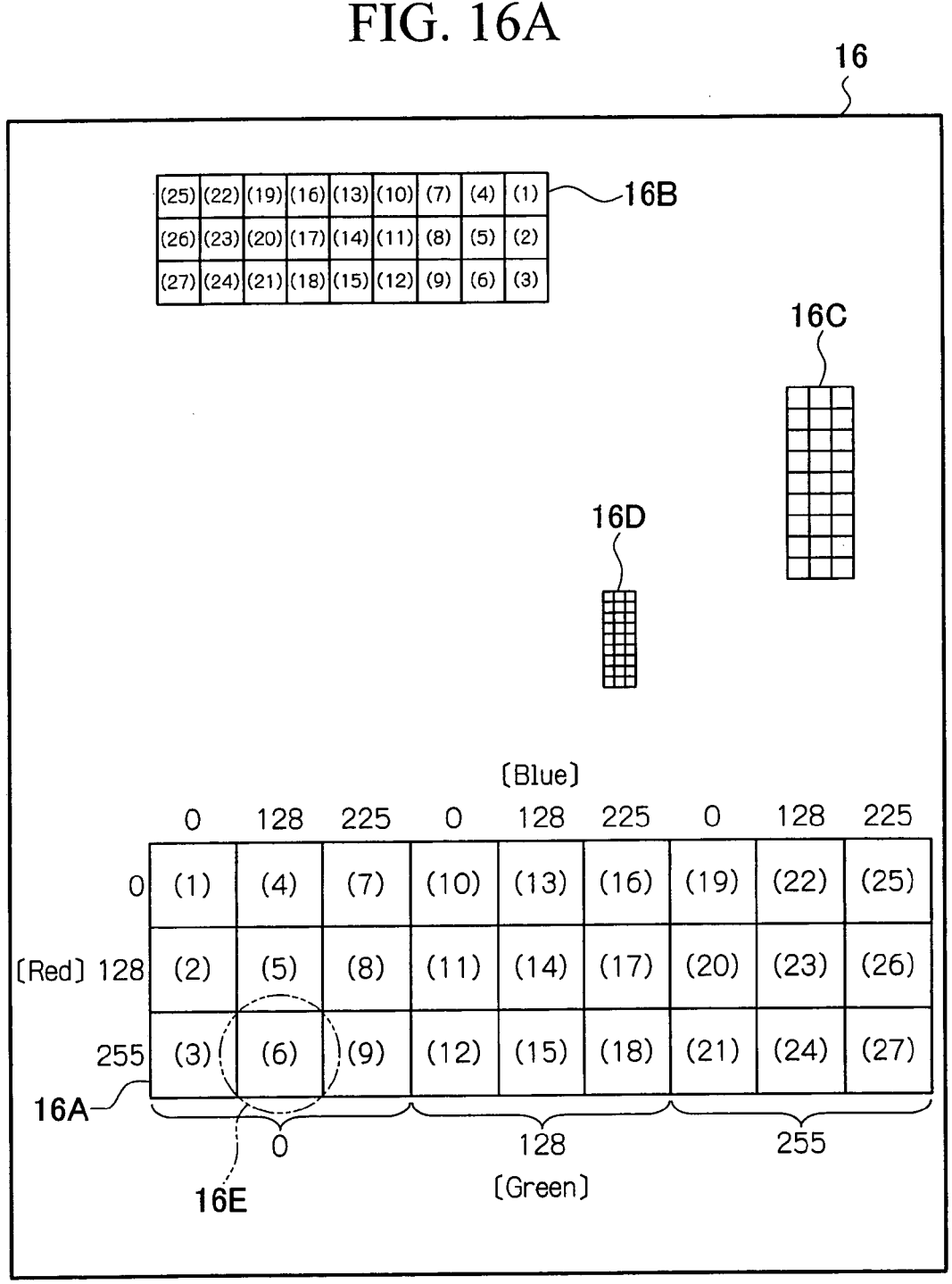
FIG. 16A is a diagram showing an image pattern used for evaluating whether accurate colors corresponding to command signals are output and a print having no unevenness in color is obtained, and whether colors having high sensitivity are output, in an embodiment according to the present invention.
FIG. 16B is a diagram for explaining divided portions of each section in a color pattern chart.

Below, FIG. 16A will be explained. FIG. 16A is a diagram showing an image pattern 16 used for evaluation for color printing using a printer, that is, for evaluating (i) whether accurate colors corresponding to command signals (for commanding colors) are output and a print having no unevenness in color (i.e., having uniformity in color) is obtained, and (ii) whether colors having high sensitivity are output.

The image pattern 16 includes a color pattern chart indicated by reference symbol 16A, in which 27 kinds of colors, each having a different set of tristimulus values, are respectively and successively printed on divided sections in a specific area. More specifically, the following tristimulus values are assigned to each of the sections (1) to (27): section (1) has "R:G:B=0:0:0", section (2) has "R:G:B=128:0:0", section (3) has "R:G:B=255:0:0", section (4) has "R:G:B=0:0:128", section (5) has "R:G:B=128:0:128", section (6) has "R:G:B=255:0:128", section (7) has "R:G:B=0:0:255", section (8) has "R:G:B=128:0:255", section (9) has "R:G:B=255:0:255", section (10) has "R:G:B=0:128:0", section (11) has "R:G:B=128:128:0", section (12) has "R:G:B=255:128:0", section (13) has "R:G:B=0:128:128", section (14) has "R:G:B=128:128:128", section (15) has "R:G:B=255:128:128", section (16) has "R:G:B=0:128:255", section (17) has "R:G:B=128:128:255", section (18) has "R:G:B=255:128:255", section (19) has "R:G:B=0:255:0", section (20) has "R:G:B=128:255:0", section (21) has "R:G:B=255:255:0", section (22) has "R:G:B=0:255:128", section (23) has "R:G:B=128:255:128", section (24) has "R:G:B=255:255:128", section (25) has "R:G:B=0:255:255", section (26) has "R:G:B=128:255:255", and section (27) has "R:G:B=255:255:255".

In FIG. 16A, "[Red], [Green], [Blue]" and numerals, which surround the color pattern chart 16A, are conveniently added so as to indicate each combination of the tristimulus values for each section.

The image pattern 16 also includes another color pattern chart indicated by reference symbol 16B which is obtained by reducing the size of the color pattern chart 16A to half and by changing the arrangement of the colors in a manner such that the color arrangements of the charts 16A and 16B have an inverse relationship in the right-left direction on the paper, as shown in FIG. 16A.

The image pattern 16 also includes another color pattern chart indicated by reference symbol 16C which is obtained by reducing the size of the color pattern chart 16B to half, and the color arrangement of the color pattern chart 16C is obtained by rotating the color pattern chart 16A in the counterclockwise direction by 90°.

The image pattern 16 also includes another color pattern chart indicated by reference symbol 16D which is obtained by reducing the size of the color pattern chart 16C to half, and the color arrangement of the color pattern chart 16D is obtained by rotating the color pattern chart 16B in the counterclockwise direction by 90°.

Each of the color pattern charts 16B to 16D has the same sets of the tristimulus values (i.e., the same sets of colors) as those of the color pattern chart 16A, that is, the difference is only the arrangement of colors and the size of the sections. The data of the output color (i.e., the command signal) for each section in each of the color pattern charts 16A to 16D is input in advance into a computer (e.g., a personal computer), and based on the input data, the image pattern 16 is color-printed (on a paper) using a printer.

The printed image pattern 16 is then read via a scanner or a three-dimensional measurement device into the computer. Based on the data for the image pattern 16, the computer first divides each section in each of the color pattern charts 16A and 16B into 9 smaller sections by dividing each length in the vertical and horizontal directions into three equal parts (see the enlarged portion indicated by reference symbol 16E in FIG. 16B). Here, the portion 16E corresponds to the section (6) in FIG. 16A.

In each section, three portions (i.e., three smaller sections) are used for color analysis. For example, the enlarged portion 16E has nine divided portions 1-1, 1-2, 1-3, 2-1, 2-2, 2-3, 3-1, 3-2, and 3-3 from the upper-left side to the lower-right side (refer to FIG. 16B). Among these divided portions, the portions 1-1, 2-2, and 3-3 are selected for color analysis, that is, the maximum value and the minimum value for each of the tristimulus values for each selected portion are measured using the computer. Accordingly, based on a quality engineering method, it is possible to evaluate whether accurate colors corresponding to the command signals (for commanding colors) are output without unevenness in color (i.e., with uniformity in color) in color printing using the printer.

Here, the maximum value and the minimum value for each of the tristimulus values (for R, G, and B) are treated as output signals.

The following table 1 shows the maximum value and the minimum value for each of the tristimulus values (for R, G, and B) at each of the divided portions 1-1, 2-2, and 3-3 in each section of each of the color pattern chart 16A (indicated by $N_1$) and the color pattern chart 16B (indicated by $N_2$).

TABLE 1

| | divided portion | maximum/ minimum | R | G | B |
|---|---|---|---|---|---|
| $N_1$ | 1-1 | maximum | $Rmax_{11}$ | $Gmax_{11}$ | $Bmax_{11}$ |
| | | minimum | $Rmin_{11}$ | $Gmin_{11}$ | $Bmin_{11}$ |
| | 2-2 | maximum | $Rmax_{12}$ | $Gmax_{12}$ | $Bmax_{12}$ |
| | | minimum | $Rmin_{12}$ | $Gmin_{12}$ | $Bmin_{12}$ |
| | 3-3 | maximum | $Rmax_{13}$ | $Gmax_{13}$ | $Bmax_{13}$ |
| | | minimum | $Rmin_{13}$ | $Gmin_{13}$ | $Bmin_{13}$ |

TABLE 1-continued

| | divided portion | maximum/minimum | R | G | B |
|---|---|---|---|---|---|
| $N_2$ | 1-1 | maximum | $Rmax_{21}$ | $Gmax_{21}$ | $Bmax_{21}$ |
| | | minimum | $Rmin_{21}$ | $Gmin_{21}$ | $Bmin_{21}$ |
| | 2-2 | maximum | $Rmax_{22}$ | $Gmax_{22}$ | $Bmax_{22}$ |
| | | minimum | $Rmin_{22}$ | $Gmin_{22}$ | $Bmin_{22}$ |
| | 3-3 | maximum | $Rmax_{23}$ | $Gmax_{23}$ | $Bmax_{23}$ |
| | | minimum | $Rmin_{23}$ | $Gmin_{23}$ | $Bmin_{23}$ |

On the computer, based on the maximum value and the minimum value for each of the tristimulus values (for R, G, and B) at each of the divided portions 1-1, 2-2, and 3-3 in each section of each of the color pattern charts 16A and 16B, the S/N ratio and the sensitivity for the command and output signals are calculated by employing a quality engineering method. This calculation is performed for two kinds of the color pattern charts (i.e., 16A and 16B); however, the accuracy for the S/N ratio and the sensitivity can be improved if using four color pattern charts 16A to 16D.

When the S/N ratio has a large value, high accuracy for color output is evaluated, that is, it is evaluated that accurate colors corresponding to the command signals (for the output colors) are output without unevenness in color (i.e., having uniformity in color) in the color printing on a paper using the printer. When the sensitivity has a value close to 1, high accuracy for color sensitivity is evaluated, that is, it is evaluated that output colors accurately correspond to the command signals.

The reason for calculating the S/N ratio and the sensitivity by using the different color pattern charts is that changes in the output signal (versus the command signal) caused by the different color pattern charts (i.e., different environmental conditions such as the size or the color arrangement in the chart) are used in the calculation using the quality engineering method.

According to the following steps 1 to 7, the S/N ratio and the sensitivity for the command and output signals are calculated by using two color pattern charts 16A and 16B.

Step 1: First, in order to grasp the general data condition, the values of all output data (i.e., all output signals) are summed after squaring each value. That is, the total variation $S_{TR}$ is defined as follows:

$S_{TR} = Rmax11^2 + Rmin11^2 + Rmax12^2 + Rmin12^2 + Rmax13^2 + Rmin13^2 + Rmax21^2 + Rmin21^2 + Rmax22^2 + Rmin22^2 + Rmax23^2 + Rmin23^2$ Step 2: Next, in order to determine the effect by the average, the sum of all output data is squared and the result is divided by the number of data items (i.e., the number of the output signals: 12). That is, the general average $S_{mR}$ is defined as follows:

$$S_{mR} = \frac{(R\max11 + R\min11 \cdots + R\max21 \cdots + R\min23)^2}{12}$$

Step 3: Next, calculation for determining the effect by the error (i.e., the difference between the color pattern charts) is performed. That is, the error dispersion $S_{N \times mR}$ is obtained by (i) squaring the sum of the measured values in the error sequence 1 (corresponding to the color pattern chart 16A), (ii) squaring the sum of the measured values in the error sequence 2 (corresponding to the color pattern chart 16B), (iii) multiplying the sum of the two results (of the squaring operation) by the number of the error sequences (here, 2), (iv) dividing the product by the number of data items (here, 12), and (v) subtracting the general average $S_{mR}$ from the quotient.

$$S_{N \times mR} = \frac{[(R\max11 + \cdots + R\min13)^2 + (R\max21 + \cdots + R\min23)^2] \times 2}{12} - S_{mR}$$

Step 4: Next, in order to determine the variation caused by the error, which indicates the effect by dispersion, the general average $S_{mR}$ and the error dispersion $S_{N \times mR}$ (which indicates the effect by the error) are subtracted from the sum of all data values of the output signals (i.e., $S_{TR}$). That is, the variation $S_{eR}$ in individual difference is defined as follows:

$S_{eR} = S_{TR} - S_{mR} - S_{N \times mR}$

Step 5: Next, in order to determine the error dispersion, the variation $S_{eR}$ (i.e., the effect by dispersion) is divided by a value obtained by subtracting (i) the number of kinds of the proportional terms (here, 1) and (ii) the difference between the proportional terms (here, 0), from the total number of data items. That is, the error dispersion $V_{eR}$ is defined as follows:

$$V_{eR} = \frac{S_{eR}}{(12 - 1)}$$

Step 6: Next, the dispersion in the output results versus the input signals is calculated using the above calculated results. That is, the S/N ratio $\eta_R$ is obtained by (i) subtracting the error dispersion $V_{eR}$ from the general average $S_{mR}$, (ii) dividing the difference by a value obtained by multiplying the total number of data items by the error dispersion $V_{eR}$, and (iii) multiplying the logarithm of the quotient by 10.

$$\eta_R = 10\log\left(\frac{(S_{mR} - V_{eR})}{(12 \times V_{eR})}\right)$$

The calculated result (i.e., the S/N ratio) indicates errors of the outputs with respect to the input signals. Therefore, if no error is produced, there is no dispersion and the S/N ratio has an infinite quantity.

Step 7: Next, calculation for determining whether the output (signal) is larger than the input signal (i.e., command signal) is performed. That is, the sensitivity S is obtained by (i) subtracting the error dispersion $V_{eR}$ from the general average $S_{mR}$, (ii) dividing the difference by the total number of data items, and (iii) multiplying the logarithm of the quotient by 10. That is, the sensitivity $S_R$ which numerically indicates the state of dispersion is defined by the following formula:

$$S_R = 10\log\left(\frac{(S_{mR} - V_{eR})}{2}\right)$$

The above series of steps is also executed for each of colors G and B. The evaluation for color printing using the printer is performed based on the S/N ratios and the sensitivities calculated by using the command signals and the output signals for the colors R, G, and B. That is, when the S/N ratios has large values, it is evaluated that the accuracy is high, more specifically, the colors commanded by the command signals are accurately output without unevenness in color (i.e., with uniformity in color). In addition, when the sensitivities have values close to 1, it is evaluated that the output colors accurately correspond to the command signals.

Figure 17:
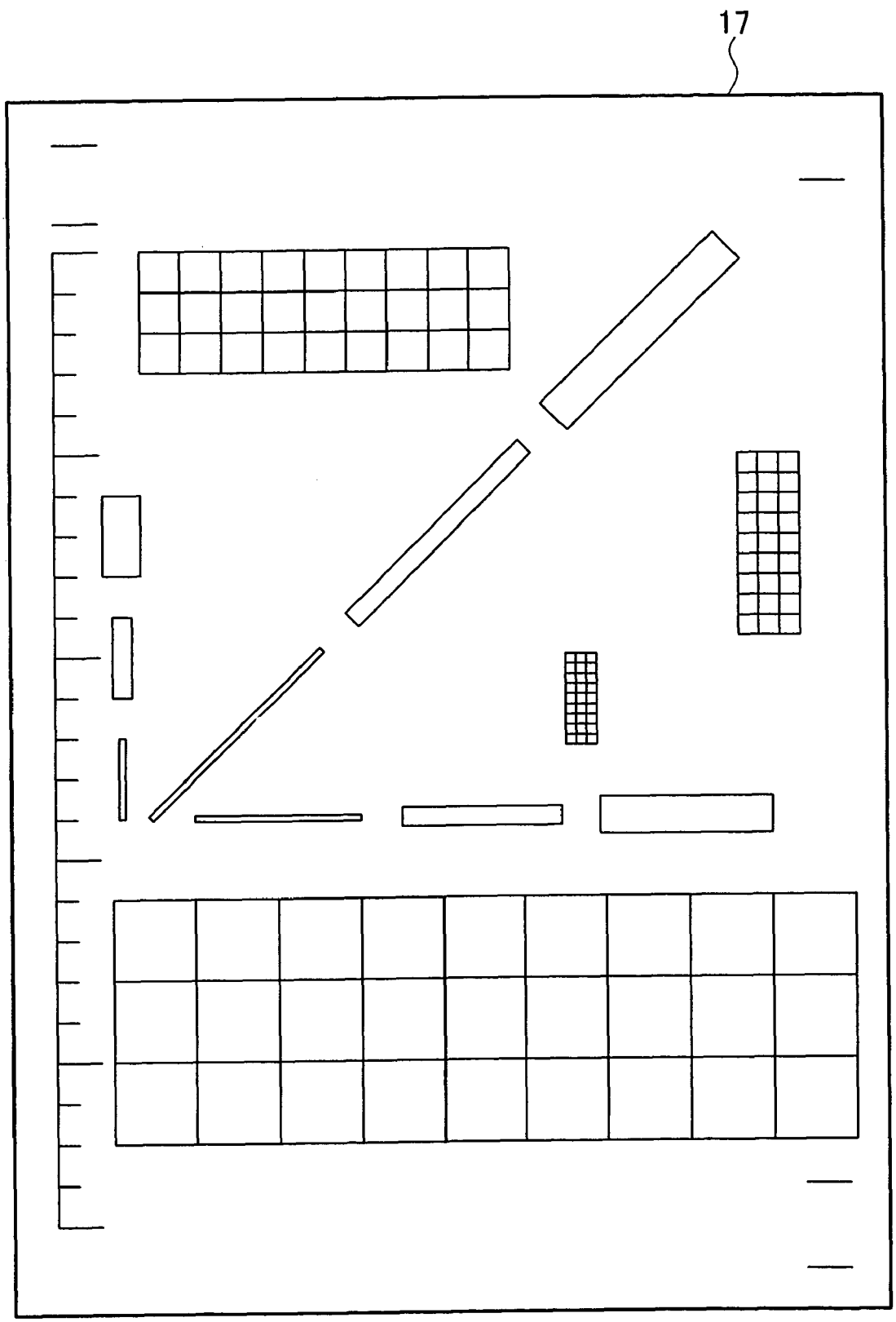
FIG. 17 is a diagram showing an image pattern which includes a plurality of image patterns.

Below, FIG. 17 will be explained. FIG. 17 is a diagram showing an image pattern 17 which includes a plurality of image patterns. That is, data necessary for printing the above-explained image patterns are input in advance into a computer, and the data for the image patterns are output from the computer to a printer, thereby printing the image pattern 17.

According to the image pattern 17, various kinds of the image pattern output accuracies can be evaluated by a single image pattern, that is, without respectively printing the above-explained image patterns.

What is claimed is:

1. A method of evaluating an image pattern output accuracy, comprising:
   a command signal setting step of setting command signals which respectively provide different distances from a reference point to at least three other points;
   an image pattern output step of outputting an image pattern which indicates reference coordinates of the reference point and distant measurement coordinates of said at least three points;
   an image pattern reading step of optically reading the image pattern;
   a coordinate data obtaining step of obtaining data of the reference coordinates and the distant measurement coordinates from the image pattern read in the image pattern reading step;
   a distance calculating step of calculating each distance between the reference coordinates obtained in the coordinate data obtaining step and the distance measurement coordinates obtained in the coordinate data obtaining step, and outputting output signals which respectively provide the calculated distances; and
   an S/N ratio and sensitivity calculating step of calculating based on the command signals and the output signals, at least one of an S/N ratio, which indicates a degree of dispersion of the output signals with respect to the command signals, and a sensitivity of the output signals with respect to the command signals, based on a variation and errors in the output signals, and linearity between the command signals and the output signals, by using a quality engineering method.

2. A method of evaluating a printing accuracy, comprising:
   a command signal setting step of setting command signals which respectively provide different distances from a reference point to at least three other points;
   a printing step of printing an image pattern, which indicates reference coordinates of the reference point and distant measurement coordinates of said at least three points, on different papers by using a printing system, in a manner such that the reference point and said at least three points align in a direction substantially parallel to a paper feeding direction;
   an image pattern reading step of optically reading each image pattern printed on each of the different papers;
   a coordinate data obtaining step of obtaining data of the reference coordinates and the distant measurement coordinates from each image pattern on each paper read in the image pattern reading step;
   a distance calculating step of calculating for each paper, each distance between the reference coordinates obtained in the coordinate data obtaining step and the distance measurement coordinates obtained in the coordinate data obtaining step, and outputting output signals which respectively provide the calculated distances; and
   an S/N ratio and sensitivity calculating step of calculating based on the command signals and the output signals, at least one of an S/N ratio, which indicates a degree of dispersion of the output signals with respect to the command signals, and a sensitivity of the output signals with respect to the command signals.

3. A method as claimed in claim 2, wherein:
   in the printing step, the image pattern is color-printed using a plurality of color elements which partially overlap with each other and produce a printed color; and
   the coordinate data obtaining step includes distinguishing each color element and measuring the reference coordinates and the distant measurement coordinates for each color element.

4. A method as claimed in claim 2, wherein:
   in the printing step, the image pattern is color-printed using a plurality of color elements which partially overlap with each other and produce a printed color; and
   in the coordinate data obtaining step, the reference coordinates and the distant measurement coordinates are measured at a position where the color elements are overlapped with each other.

5. A method of evaluating a printing accuracy, comprising:
   a command signal setting step of setting command signals which respectively provide different distances from a reference point to at least three other points;
   a printing step of printing an image pattern, which indicates reference coordinates of the reference point and distant measurement coordinates of said at least three points, on different papers by using a printing system, in a manner such that the reference point and said at least three points align in a direction substantially parallel to a direction in which an inkhead of the printing system moves;
   an image pattern reading step of optically reading each image pattern printed on each of the different papers;
   a coordinate data obtaining step of obtaining data of the reference coordinates and the distant measurement coordinates from each image pattern on each paper read in the image pattern reading step;
   a distance calculating step of calculating for each paper, each distance between the reference coordinates obtained in the coordinate data obtaining step and the distance measurement coordinates obtained in the coordinate data obtaining step, and outputting output signals which respectively provide the calculated distances; and
   an S/N ratio and sensitivity calculating step of calculating based on the command signals and the output signals, at least one of an S/N ratio, which indicates a degree of dispersion of the output signals with respect to the command signals, and a sensitivity of the output signals with respect to the command signals.

6. A method as claimed in claim 5, wherein:
in the printing step, the image pattern is color-printed using a plurality of color elements which partially overlap with each other and produce a printed color; and
the coordinate data obtaining step includes distinguishing each color element and measuring the reference coordinates and the distant measurement coordinates for each color element.

7. A method as claimed in claim 5, wherein:
in the printing step, the image pattern is color-printed using a plurality of color elements which partially overlap with each other and produce a printed color; and
in the coordinate data obtaining step, the reference coordinates and the distant measurement coordinates are measured at a position where the color elements are overlapped with each other.

8. A method of evaluating a printing accuracy, comprising:
a command signal setting step of setting command signals which respectively provide different distances from a reference point to at least three other points;
a printing step of printing an image pattern, which indicates reference coordinates of the reference point and distant measurement coordinates of said at least three points, on different papers by using a printing system, in a manner such that the reference point and said at least three points align in a direction substantially parallel to a combined direction of a paper feeding direction and a direction in which an inkhead of the printing system moves;
an image pattern reading step of optically reading each image pattern printed on each of the different papers;
a coordinate data obtaining step of obtaining data of the reference coordinates and the distant measurement coordinates from each image pattern on each paper read in the image pattern reading step;
a distance calculating step of calculating for each paper, each distance between the reference coordinates obtained in the coordinate data obtaining step and the distance measurement coordinates obtained in the coordinate data obtaining step, and outputting output signals which respectively provide the calculated distances; and
an S/N ratio and sensitivity calculating step of calculating based on the command signals and the output signals, at least one of an S/N ratio, which indicates a degree of dispersion of the output signals with respect to the command signals, and a sensitivity of the output signals with respect to the command signals.

9. A method as claimed in claim 8, wherein:
in the printing step, the image pattern is color-printed using a plurality of color elements which partially overlap with each other and produce a printed color; and
the coordinate data obtaining step includes distinguishing each color element and measuring the reference coordinates and the distant measurement coordinates for each color element.

10. A method as claimed in claim 8, wherein:
in the printing step, the image pattern is color-printed using a plurality of color elements which partially overlap with each other and produce a printed color; and
in the coordinate data obtaining step, the reference coordinates and the distant measurement coordinates are measured at a position where the color elements are overlapped with each other.

11. A method of evaluating a printing accuracy, comprising:
a printing step of printing an image pattern on different papers by using a printing system, where the image pattern on each paper includes at least three indices which align in a paper feeding direction based on a command signal which commands a regular interval between the indices;
an image pattern reading step of optically reading each image pattern printed on each of the different papers;
an interval measuring step of measuring for each paper, intervals between the indices and outputting output signals which respectively provide the measured intervals; and
an S/N ratio and sensitivity calculating step of calculating based on the command signal and the output signals, at least one of an S/N ratio, which indicates a degree of dispersion of the output signals with respect to the command signal, and a sensitivity of the output signals with respect to the command signal.

12. A system of evaluating a printing accuracy, comprising:
a command signal setting section for setting command signals which respectively provide different distances from a reference point to at least three other points;
a printing section for printing an image pattern, which indicates reference coordinates of the reference point and distant measurement coordinates of said at least three points, on different papers by using a printing system, in a manner such that the reference point and said at least three points align in a direction substantially parallel to a paper feeding direction;
an image pattern reading section for optically reading each image pattern printed on each of the different papers;
a coordinate data obtaining section for obtaining data of the reference coordinates and the distant measurement coordinates from each image pattern on each paper read by the image pattern reading section;
a distance calculating section for calculating for each paper, each distance between the reference coordinates obtained by the coordinate data obtaining section and the distance measurement coordinates obtained by the coordinate data obtaining section, and outputting output signals which respectively provide the calculated distances; and
an S/N ratio and sensitivity calculating section for calculating based on the command signals and the output signals, at least one of an S/N ratio, which indicates a degree of dispersion of the output signals with respect to the command signals, and a sensitivity of the output signals with respect to the command signals.

13. A system as claimed in claim 12, wherein:
the printing section color-prints the image pattern by using a plurality of color elements which partially overlap with each other and produce a printed color; and
the coordinate data obtaining section distinguishes each color element and measures the reference coordinates and the distant measurement coordinates for each color element.

14. A system as claimed in claim 12, wherein:
the printing section color-prints the image pattern by using a plurality of color elements which partially overlap with each other and produce a printed color; and
the coordinate data obtaining section measures the reference coordinates and the distant measurement coordinates at a position where the color elements are overlapped with each other.

15. A system of evaluating a printing accuracy, comprising:
- a command signal setting section for setting command signals which respectively provide different distances from a reference point to at least three other points;
- a printing section for printing an image pattern, which indicates reference coordinates of the reference point and distant measurement coordinates of said at least three points, on different papers by using a printing system, in a manner such that the reference point and said at least three points align in a direction substantially parallel to a direction in which an inkhead of the printing system moves;
- an image pattern reading section for optically reading each image pattern printed on each of the different papers;
- a coordinate data obtaining section for obtaining data of the reference coordinates and the distant measurement coordinates from each image pattern on each paper read by the image pattern reading section;
- a distance calculating section for calculating for each paper, each distance between the reference coordinates obtained by the coordinate data obtaining section and the distance measurement coordinates obtained by the coordinate data obtaining section, and outputting output signals which respectively provide the calculated distances; and
- an S/N ratio and sensitivity calculating section for calculating based on the command signals and the output signals, at least one of an S/N ratio for indicating a degree of dispersion of the output signals with respect to the command signals and a sensitivity of the output signals with respect to the command signals.

16. A system as claimed in claim 15, wherein:
the printing section color-prints the image pattern by using a plurality of color elements which partially overlap with each other and produce a printed color; and
the coordinate data obtaining section distinguishes each color element and measures the reference coordinates and the distant measurement coordinates for each color element.

17. A system as claimed in claim 15, wherein:
the printing section color-prints the image pattern by using a plurality of color elements which partially overlap with each other and produce a printed color; and
the coordinate data obtaining section measures the reference coordinates and the distant measurement coordinates at a position where the color elements are overlapped with each other.

18. A system of evaluating a printing accuracy, comprising:
- a command signal setting section for setting command signals which respectively provide different distances from a reference point to at least three other points;
- a printing section for printing an image pattern, which indicates reference coordinates of the reference point and distant measurement coordinates of said at least three points, on different papers by using a printing system, in a manner such that the reference point and said at least three points align in a direction substantially parallel to a combined direction of a paper feeding direction and a direction in which an inkhead of the printing system moves;
- an image pattern reading section for optically reading each image pattern printed on each of the different papers;
- a coordinate data obtaining section for obtaining data of the reference coordinates and the distant measurement coordinates from each image pattern on each paper read by the image pattern reading section;
- a distance calculating section for calculating for each paper, each distance between the reference coordinates obtained by the coordinate data obtaining section and the distance measurement coordinates obtained by the coordinate data obtaining section, and outputting output signals which respectively provide the calculated distances; and
- an S/N ratio and sensitivity calculating section for calculating based on the command signals and the output signals, at least one of an S/N ratio, which indicates a degree of dispersion of the output signals with respect to the command signals, and a sensitivity of the output signals with respect to the command signals.

19. A system as claimed in claim 18, wherein:
the printing section color-prints the image pattern by using a plurality of color elements which partially overlap with each other and produce a printed color; and
the coordinate data obtaining section distinguishes each color element and measures the reference coordinates and the distant measurement coordinates for each color element.

20. A system as claimed in claim 18, wherein:
the printing section color-prints the image pattern by using a plurality of color elements which partially overlap with each other and produce a printed color; and
the coordinate data obtaining section measures the reference coordinates and the distant measurement coordinates at a position where the color elements are overlapped with each other.

21. A system of evaluating a printing accuracy, comprising:
- a printing section for printing an image pattern on different papers by using a printing system, where the image pattern on each paper includes at least three indices which align in a paper feeding direction based on a command signal which commands a regular interval between the indices;
- an image pattern reading section for optically reading each image pattern printed on each of the different papers;
- an interval measuring section for measuring for each paper, intervals between the indices and outputting output signals which respectively provide the measured intervals; and
- an S/N ratio and sensitivity calculating section for calculating based on the command signal and the output signals, at least one of an S/N ratio, which indicates a degree of dispersion of the output signals with respect to the command signal, and a sensitivity of the output signals with respect to the command signal.

* * * * *

UNITED STATES PATENT AND TRADEMARK OFFICE
CERTIFICATE OF CORRECTION

PATENT NO. : 7,388,687 B2 Page 1 of 1
APPLICATION NO. : 10/452120
DATED : June 17, 2008
INVENTOR(S) : Mamoru Hatakeyama It is certified that error appears in the above-identified patent and that said Letters Patent is hereby corrected as shown below:

Title page, column 1, section (75), please change the Inventor's city from "Sakota" to --Sakata--.

Signed and Sealed this

Thirtieth Day of September, 2008

JON W. DUDAS
*Director of the United States Patent and Trademark Office*